US010264152B2

(12) United States Patent
Moribayashi

(10) Patent No.: US 10,264,152 B2
(45) Date of Patent: Apr. 16, 2019

(54) INFORMATION PROCESSING DEVICE, COMPUTER-READABLE RECORDING MEDIUM, AND SYSTEM

(71) Applicant: Yuta Moribayashi, Kanagawa (JP)

(72) Inventor: Yuta Moribayashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 57 days.

(21) Appl. No.: 15/071,524

(22) Filed: Mar. 16, 2016

(65) Prior Publication Data

US 2016/0277594 A1 Sep. 22, 2016

(30) Foreign Application Priority Data

Mar. 19, 2015 (JP) ................... 2015-056288
Feb. 4, 2016 (JP) ................... 2016-019510

(51) Int. Cl.
*H04N 1/00* (2006.01)
*G06F 3/12* (2006.01)

(52) U.S. Cl.
CPC ....... *H04N 1/00946* (2013.01); *G06F 3/1276* (2013.01); *H04N 1/00941* (2013.01)

(58) Field of Classification Search
CPC ........... H04N 1/00217; H04N 1/00222; H04N 1/00244; H04N 1/00411; H04N 1/00421; H04N 1/00424; H04N 1/00435; H04N 1/00448; H04N 1/00461; H04N 1/00464; H04N 1/00474; H04N 1/00477; H04N 1/00482; H04N 1/00811; H04N 1/00941; H04N 1/00946; H04N 1/2187; H04N 1/2191; H04N 1/32518; G06F 9/4411; G06F 3/1268; G06F 3/1276; G06F 3/1285; G06F 3/1289; G06F 3/1293
(Continued)

(56) References Cited

U.S. PATENT DOCUMENTS 5,720,013 A * 2/1998 Uda ................... H04N 1/00204
358/1.15
5,911,044 A * 6/1999 Lo ...................... H04N 1/00236
709/203
(Continued)

FOREIGN PATENT DOCUMENTS

JP 2003-271353 9/2003
JP 4522358 6/2010

*Primary Examiner* — Chad Dickerson
(74) *Attorney, Agent, or Firm* — Oblon, McClelland, Maier & Neustadt, L.L.P.

(57) ABSTRACT

An information processing device includes a specification unit configured to receive identification information for identifying a scanner device, and specify a driver configured to control the scanner device identified by the identification information; an item acquirer configured to acquire a list of items that are settable by the specified driver for controlling the scanner device, and return the list to a transmission source of the identification information; a scan instruction receiver configured to receive a scan instruction and set values for the respective items from the transmission source of the identification information; and an execution controller configured to send, in accordance with the reception of the scan instruction, the set values to the driver that is specified based on the identification information to cause the driver to perform scan using the scanner device.

14 Claims, 24 Drawing Sheets

(58) Field of Classification Search
USPC ....... 358/1.11–1.18, 400–403, 505; 709/217; 715/738
See application file for complete search history.

(56) References Cited

U.S. PATENT DOCUMENTS

| | | | | |
|---|---|---|---|---|
| 8,994,967 | B1* | 3/2015 | Mayers | G06F 17/30964 358/1.13 |
| 2003/0007177 | A1* | 1/2003 | Ferlitsch | G06F 3/1285 358/1.15 |
| 2004/0212842 | A1* | 10/2004 | Miyamoto | H04N 1/00241 358/407 |
| 2005/0081137 | A1* | 4/2005 | Ferlitsch | H04N 1/00204 715/276 |
| 2007/0159652 | A1 | 7/2007 | Sato | |
| 2010/0208297 | A1* | 8/2010 | Takamiya | H04N 1/0097 358/1.15 |
| 2011/0299113 | A1* | 12/2011 | Ikegawa | H04N 1/00204 358/1.15 |
| 2012/0081731 | A1* | 4/2012 | Suzuki | G06F 3/1205 358/1.13 |
| 2012/0170066 | A1 | 7/2012 | Moribayashi | |
| 2012/0182575 | A1* | 7/2012 | Ikeda | H04N 1/00225 358/1.15 |
| 2012/0307300 | A1* | 12/2012 | Takano | H04N 1/00217 358/1.15 |
| 2012/0311452 | A1* | 12/2012 | Takano | G06F 9/4411 715/738 |
| 2014/0022600 | A1* | 1/2014 | Moroi | H04N 1/00244 358/1.15 |
| 2014/0355026 | A1 | 12/2014 | Moribayashi | |

* cited by examiner

INFORMATION PROCESSING DEVICE, COMPUTER-READABLE RECORDING MEDIUM, AND SYSTEM

CROSS-REFERENCE TO RELATED APPLICATIONS

The present application claims priority to and incorporates by reference the entire contents of Japanese Patent Application No. 2015-056288 filed in Japan on Mar. 19, 2015 and Japanese Patent Application No. 2016-019510 filed in Japan on Feb. 4, 2016.

BACKGROUND OF THE INVENTION

1. Field of the Invention

The present invention relates to an information processing device, a computer-readable recording medium, and a system.

2. Description of the Related Art

Scanner driver programs for controlling a scanner device have been known. A computer executes the scanner driver program to control the scanner device, and causes the scanner device to scan a sheet medium such as a paper sheet to generate image data.

Typically, the number of items that can be set in the scanner driver program is larger than that of items that can be set in a main body of the scanner device, and content of setting is more detail in the scanner driver program than that in the scanner device. For example, even when the maximum resolution of the scanner device is 600 dots per inch (dpi), the maximum resolution with the scanner driver program may be 1200 dpi in some cases. Thus, to scan a sheet and the like with more detailed setting, a user needs to cause the computer to execute the scanner driver program.

However, to cause the computer to execute the scanner driver program, the user has been required to move to the computer to perform operation after setting a sheet on the scanner device.

Therefore, there is a need to provide an information processing device, a computer program, and a system that can reduce labor of the user for performing operation.

SUMMARY OF THE INVENTION

It is an object of the present invention to at least partially solve the problems in the conventional technology.

According to an embodiment, there is provided an information processing device configured to communicate with a scanner device. The information processing device includes a specification unit configured to receive identification information for identifying the scanner device, and specify a driver configured to control the scanner device identified by the identification information; an item acquirer configured to acquire a list of items that are settable by the specified driver for controlling the scanner device, and return the list to a transmission source of the identification information; a scan instruction receiver configured to receive a scan instruction and set values for the respective items from the transmission source of the identification information; and an execution controller configured to send, in accordance with the reception of the scan instruction, the set values to the driver that is specified based on the identification information to cause the driver to perform scan using the scanner device.

According to another embodiment, there is provided a non-transitory computer-readable storage medium with an executable program stored thereon and executed by a computer configured to communicate with a scanner device. The program instructs the computer to perform receiving identification information for identifying the scanner device; specifying a driver configured to control the scanner device identified by the identification information; acquiring a list of items that are settable by the specified driver for controlling the scanner device; returning the list to a transmission source of the identification information; receiving a scan instruction and set values for the respective items from the transmission source of the identification information; and sending, in response to the reception of the scan instruction, the set values to the driver that is specified based on the identification information to cause the driver to perform scan using the scanner device.

According to still another embodiment, there is provided a system that includes a scanner device; and an information processing device configured to communicate with the scanner device. The information processing device includes a specification unit configured to receive identification information for identifying the scanner device, and specify a driver configured to control the scanner device identified by the identification information; an item acquirer configured to acquire a list of items that are settable by the specified driver for controlling the scanner device, and return the list to a transmission source of the identification information; a scan instruction receiver configured to receive a scan instruction and set values for the respective items from the transmission source of the identification information; and an execution controller configured to send, in accordance with the reception of the scan instruction, the set values to the driver that is specified based on the identification information to cause the driver to perform scan using the scanner device.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

First Embodiment

Figure 1:
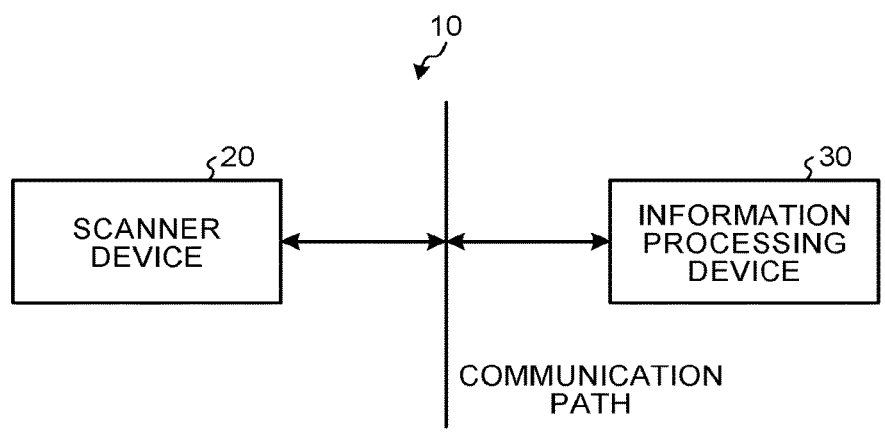
FIG. 1 is a diagram illustrating a configuration of an information processing system according to an embodiment.

FIG. 1 is a diagram illustrating a configuration of an information processing system 10 according to an embodiment. The information processing system 10 includes a scanner device 20 and an information processing device 30.

The scanner device 20 scans a sheet and the like set by a user, and generates image data representing an image on a surface of the sheet and the like. The scanner device 20 has a communication function, and can communicate with the information processing device 30 via a communication path. The communication path may be a local network such as an intracompany local area network (LAN), or an external network such as the Internet. The communication path may be a dedicated control line between the scanner device 20 and the information processing device 30. The scanner device 20 may be part of a function of a multifunction peripheral (MFP).

The information processing device 30 is a computer, and executes a computer program. The information processing device 30 executes an operating system. The information processing device 30 further executes an application program on the operating system. The information processing device 30 has a communication function, and can communicate with the scanner device 20 via the communication path.

The information processing device 30 executes a driver program for controlling the scanner device 20. By executing the driver program, the information processing device 30 can activate the scanner device 20 via the communication path, and cause the scanner device 20 to scan a sheet and the like to generate image data.

In the information processing system 10 according to the embodiment, the user can cause the scanner device 20 to be controlled by using the driver program of the information processing device 30 without operating the information processing device 30 itself after setting a sheet and the like on the scanner device 20. In this case, the user can also perform setting of the driver program without operating the information processing device 30. Accordingly, the information processing system 10 according to the embodiment can reduce labor of the user for performing operation and achieve sophisticated scan.

Figure 2:
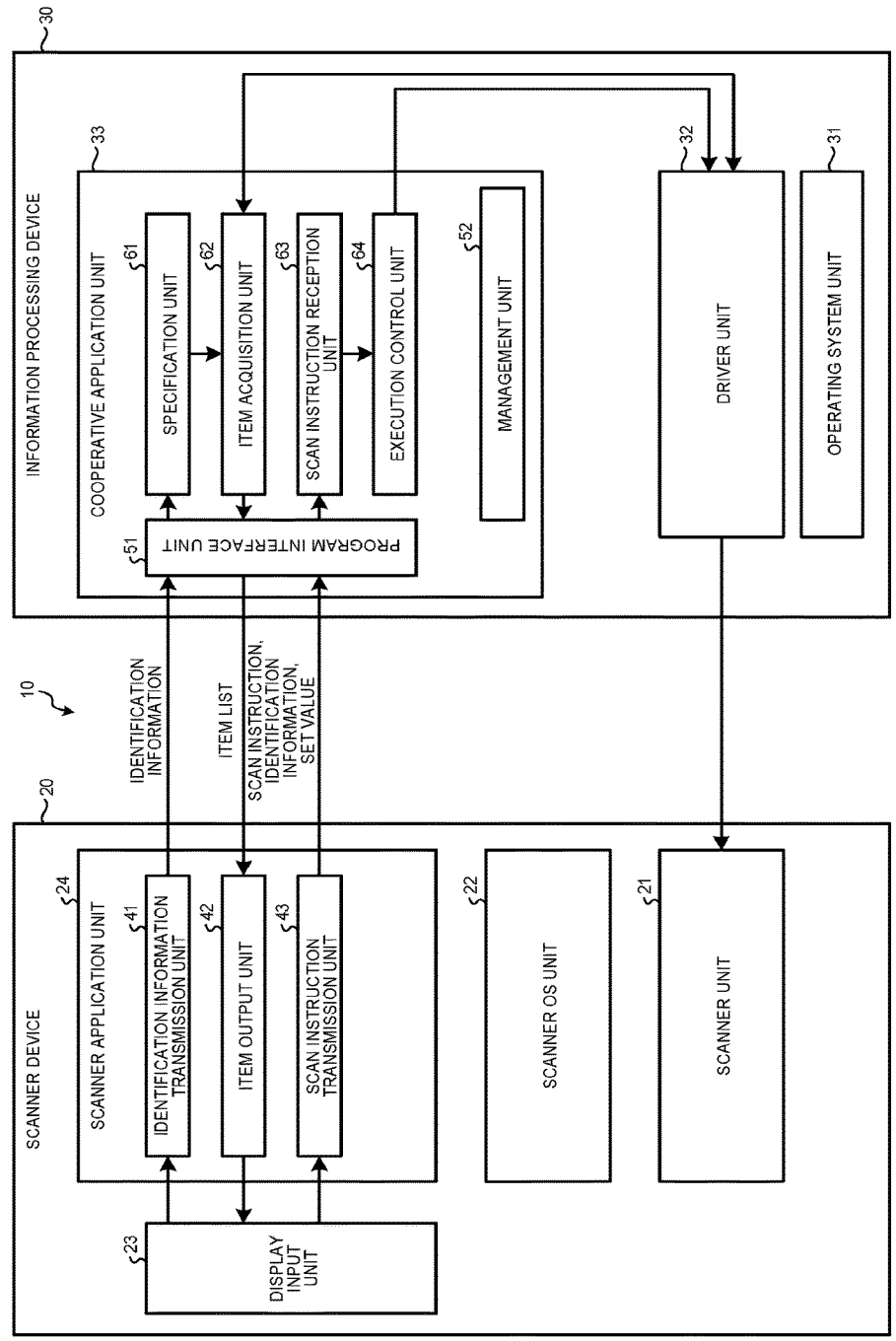
FIG. 2 is a diagram illustrating a functional configuration of a scanner device and an information processing device according to a first embodiment.

FIG. 2 is a diagram illustrating a functional configuration of the scanner device 20 and the information processing device 30 according to the first embodiment. The scanner device 20 includes a scanner unit 21, a scanner OS unit 22, a display input unit 23, and a scanner application unit 24.

The scanner unit 21 scans a sheet and the like to generate image data representing an image of a surface of the sheet and the like. An operation of the scanner unit 21 is controlled by the information processing device 30 via the communication path. When the information processing device 30 is not connected, the operation of the scanner unit 21 is controlled by the scanner OS unit 22.

The scanner OS unit 22 manages and controls the entire scanner device 20. The scanner OS unit 22 is implemented when a processor such as a CPU executes the operating system. The operating system may be, for example, a general-purpose computer program for a mobile device such as Android (registered trademark), or a computer program dedicated to the scanner device 20.

The display input unit 23 provides a user interface to the user via a display panel and the like. The display input unit 23 displays information to the user, and receives information input by the user.

The scanner application unit 24 controls exchange of information between itself and the information processing device 30, display of information on the display input unit 23, and input of information from the display input unit 23, and performs setting processing for causing the information processing device 30 to control the scanner unit 21. The scanner application unit 24 is implemented when the processor executes a scanner application program on the operating system.

The information processing device 30 includes an operating system unit 31, a driver unit 32, and a cooperative application unit 33.

The operating system unit 31 manages and controls the entire information processing device 30. The operating system unit 31 is implemented when the processor executes the operating system. The operating system is, for example, a general-purpose computer program such as Linux (registered trademark) or Windows (registered trademark).

The driver unit 32 controls scanning operation performed by the scanner unit 21 via the communication path. The driver unit 32 receives given set values regarding a plurality of items, and causes the scanner unit 21 to operate using the given set values. For example, the driver unit 32 receives given set values regarding items such as a sheet size, distinction between color and monochrome, resolution, and contrast, and controls the scanner unit 21 in accordance with the set values. The driver unit 32 holds default values of the set values in advance, and may control the scanner unit 21 using the default value regarding an item to which the set value is not given.

The cooperative application unit 33 performs setting and control for controlling the scanner unit 21 on the driver unit 32 in cooperation with the scanner application unit 24 of the scanner device 20. The cooperative application unit 33 is implemented when the processor executes a cooperative application program on the operating system.

The cooperative application unit 33 includes a program interface unit 51 (WebAPI), a management unit 52, a specification unit 61, an item acquisition unit 62, a scan instruction reception unit 63, and an execution control unit 64. The program interface unit 51 is implemented by a server program. The program interface unit 51 receives various requests in an HTTP format and the like from the scanner device 20. The program interface unit 51 causes a functional block included in the cooperative application unit 33 (such as the specification unit 61, the item acquisition unit 62, the scan instruction reception unit 63, and the execution control unit 64) to operate in accordance with the received request. The program interface unit 51 then returns a processing result corresponding to an operation of each functional block to the scanner device 20 as a transmission source of the request. The management unit 52 manages the cooperative application unit 33 to be always activated.

The scanner application unit 24 of the scanner device 20 includes an identification information transmission unit 41, an item output unit 42, and a scan instruction transmission unit 43.

When the user gives an activation instruction, the identification information transmission unit 41 transmits identification information for identifying the scanner device 20 to the cooperative application unit 33 via the communication path and the program interface unit 51. An example of the identification information is a device name of the scanner device 20. The identification information may be an arbitrary number determined in advance.

The specification unit 61 receives the identification information from the scanner application unit 24 of the scanner device 20 as an external device via the communication path and the program interface unit 51. The specification unit 61 specifies the driver unit 32 that controls the scanner device 20 identified by the identification information among driver units 32 included in the information processing device 30.

The item acquisition unit 62 accesses the driver unit 32 specified by the specification unit 61, and acquires a list of items that can be set for the specified driver unit 32 to control the scanner device 20. The item acquisition unit 62 then returns the acquired list of settable items to the scanner application unit 24 of the scanner device 20 as a transmission source of the identification information via the program interface unit 51 and the communication path.

The item output unit 42 receives the list of settable items from the cooperative application unit 33 of the information processing device 30 via the communication path. The item output unit 42 causes the display input unit 23 to display the received list of settable items.

The scan instruction transmission unit 43 receives an input of the set value corresponding to each displayed item from the user. The scan instruction transmission unit 43 then transmits the identification information and the set value corresponding to each item, together with a scan instruction, to the cooperative application unit 33 via the communication path.

The scan instruction reception unit 63 receives the identification information and the set value corresponding to each item, together with the scan instruction, from the scanner application unit 24 of the scanner device 20 as the transmission source of the identification information via the communication path and the program interface unit 51. The scan instruction reception unit 63 then gives the scan instruction to the execution control unit 64.

The execution control unit 64 specifies, in response to the reception of the scan instruction, the driver unit 32 that controls the scanner device 20 identified by the received identification information. In this case, the information processing device 30 may include a plurality of driver units 32 different for each of a plurality of types of scanner devices 20. The execution control unit 64 discriminates the type of the scanner device 20 that has transmitted the identification information based on the identification information, and specifies the driver unit 32 for controlling the discriminated scanner device 20. The execution control unit 64 then gives the set value to the driver unit 32 that is specified based on the identification information, and causes the driver unit 32 to perform scan using the scanner device 20.

Figure 3:
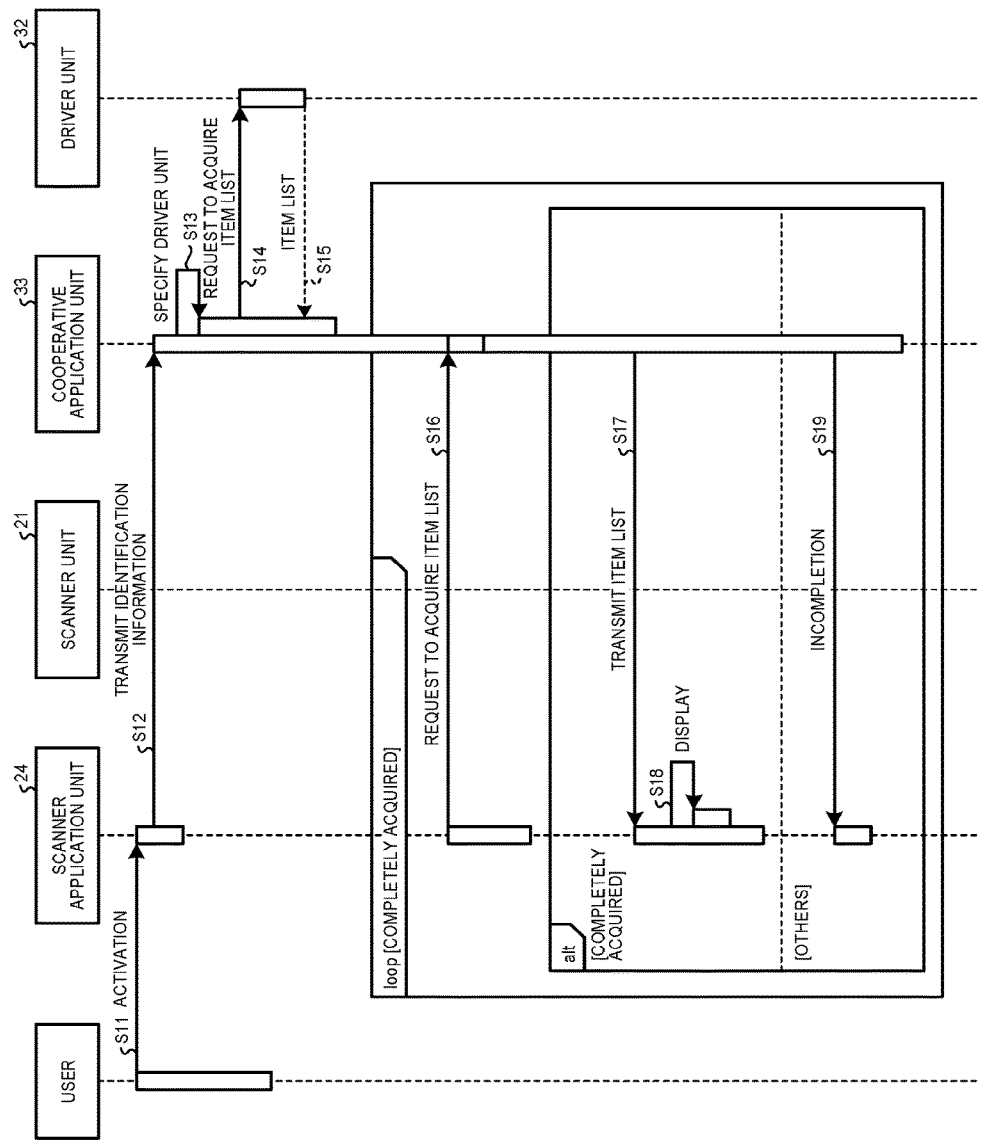
FIG. 3 is a sequence diagram of an information processing system according to the first embodiment.
Figure 4:
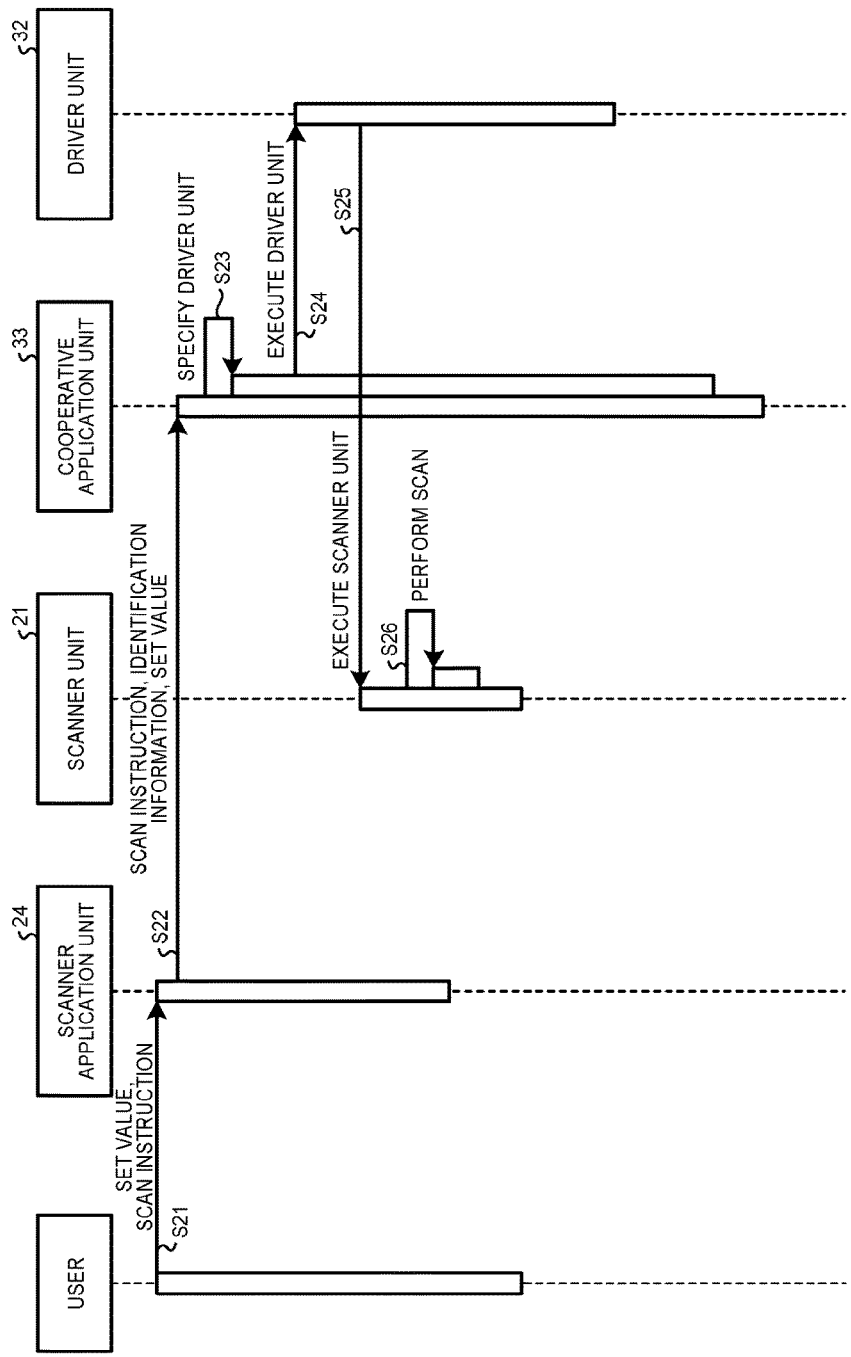
FIG. 4 is a sequence diagram subsequent to FIG. 3.

FIG. 3 is a sequence diagram of the information processing system 10 according to the first embodiment. FIG. 4 is a sequence diagram subsequent to FIG. 3. The information processing system 10 according to the first embodiment performs processing through the sequence illustrated in FIG. 3 and FIG. 4.

First, after setting a sheet and the like on the scanner device 20, the user operates the scanner device 20 to activate the scanner application unit 24 (S11). When being activated by the user, the scanner application unit 24 transmits the identification information (for example, a device name) for identifying the scanner device 20 to the cooperative application unit 33 (S12).

When receiving the identification information, the cooperative application unit 33 specifies the driver unit 32 that controls the scanner device 20 identified by the identification information (S13). Subsequently, the cooperative application unit 33 requests the specified driver unit 32 for the list of items that can be set for the specified driver unit 32 to control the scanner device 20 (S14), and acquires the list from the driver unit 32 (S15).

On the other hand, the scanner application unit 24 transmits an item list acquisition request to the cooperative application unit 33 after transmitting the identification information to the cooperative application unit 33 (S16). If the cooperative application unit 33 has already completely acquired the list from the driver unit 32 when receiving the item list acquisition request, the cooperative application unit 33 transmits the list of items to the scanner application unit 24 (S17). When receiving the acquired list of items, the scanner application unit 24 displays the received list of items (S18).

If the cooperative application unit 33 has not completely acquired the list from the driver unit 32 yet when receiving the item list acquisition request, the cooperative application unit 33 transmits a notification of incompletion to the scanner application unit 24 (S19). When receiving the notification of incompletion, the scanner application unit 24 transmits the item list acquisition request to the cooperative application unit 33 again (S16), and repeats the processing until receiving the list of items.

When the list of items is displayed, the user operates the scanner device 20 to input the set value for each item. When the set values are completely input, the user operates the scanner device 20 to give the scan instruction to the scanner application unit 24 (S21).

When receiving the scan instruction from the user, the scanner application unit 24 transmits the identification information and the set value corresponding to each item, together with the scan instruction, to the cooperative application unit 33 (S22). When receiving the scan instruction, the cooperative application unit 33 specifies the driver unit 32 that controls the scanner device 20 identified by the identification information (S23). The information processing device 30 may include a plurality of driver units 32 different for each type of the scanner device 20. The cooperative application unit 33 specifies, based on the identification information, one driver unit 32 corresponding to the type of the scanner device 20 that has transmitted the identification information. The cooperative application unit 33 then gives an execution instruction and the set value for each item to the specified driver unit 32 (S24).

When receiving the execution instruction, the driver unit 32 controls the scanner unit 21 in accordance with the set values, and executes the scanner unit 21 (S25). The scanner unit 21 then performs scan of the set sheet in accordance with control performed by the driver unit 32 (S26).

Table 1 below is an example of requests for WebAPI and responses between the scanner application unit 24 and the program interface unit 51 in the sequences illustrated in FIG. 3 and FIG. 4. By way of example, communication conforming to an HTTP protocol is performed between the scanner application unit 24 and the program interface unit 51. Requests and responses other than those in Table 1 may be present.

TABLE 1

| Sequence No. | Request/ Response | Example |
|---|---|---|
| S12 Transmission of identification information | Request | POST /scan/devicesettings HTTP/1.1<br>Host: 10.20.30.40:80<br>modelname=XXXXXXXX |
| S16 Item list acquisition request | Request | GET /scan/settings HTTP/1.1<br>Host: 10.20.30.40:80 |
| S17 Transmission of item list | Response | HTTP/1.1 200 OK<br>Content-Type: text/plain; charset=utf-8<br><?xml version="1.0" encoding="UTF-8"?><br><result><br><filename></filename><br><Xresolution>200,300,600,1200<br></Xresolution><br><Yresolution>200,300,600,1200<br></Yresolution><br><Contrast>-3,-2,-1,0,1,2,3</Contrast><br></result> |
| S19 Incompletion | Response | HTTP/1.1 200 OK<br>Content-Type: text/plain; charset=utf-8<br><?xml version="1.0" encoding="UTF-8"?><br><result><br>Not Completed<br></result> |
| S22 Scan instruction | Request | POST /scan/devicesettings HTTP/1.1<br>Host:10.20.30.40:80<br>modelname=XXXX XXXX XXXX<br>filename=20140808_conference_material1<br>Xresolution=1200<br>Yresolution=1200<br>Contrast=3 |

Transmission of the identification information at S12 is a request such that the scanner application unit 24 transmits the identification information (device name) to the program interface unit 51. "modelname=XXXXXXXX" represents a device name of the scanner device 20. "modelname" is a variable used by the program interface unit 51 to determine the device name, and is determined in advance between the scanner application unit 24 and the program interface unit 51.

The item list acquisition request at S16 is a request such that the scanner application unit 24 requests the program interface unit 51 to acquire the item list.

Transmission of the item list at S17 is a response such that the program interface unit 51 transmits the item list to the scanner application unit 24. "<filename></filename>" represents that a file name can be set. "<Xresolution>200,300, 600,1200</Xresolution>" represents that reading resolution in the X-direction can be set to be any of 200 dpi, 300 dpi, 600 dpi, and 1200 dpi. "<Yresolution>200,300,600,1200</Yresolution>" represents that the reading resolution in the Y-direction can be set to be any of 200 dpi, 300 dpi, 600 dpi, and 1200 dpi. "<Contrast>-3,-2,-1,0,1,2,3</Contrast>" represents that contrast can be set in seven levels from -3 to 3. When receiving such a response, the scanner application unit 24 causes the display input unit 23 to display these setting items so that the user can input the set value.

Incompletion at S19 is a response such that the program interface unit 51 notifies the scanner application unit 24 that the item list has not been completely acquired.

Scan instruction at S22 is a request such that the scanner application unit 24 transmits the identification information and the set value for each item, together with the scan instruction, to the program interface unit 51. "filename=20140000_conference_material1" represents a file name given to a scan file. "Xresolution=1200" represents that the reading resolution in the X-direction is 1200 dpi. "Yresolution=1200" represents that the reading resolution in the Y-direction is 1200 dpi. "Contrast=3" represents that the contrast is at the highest level. The set value input by the user is included in this request. Candidates for the set values are determined in advance so that the program interface unit 51 can determine the set value.

The number of the setting items included in the list is not limited to three. For example, the list may include items that can be set for typical scanners such as addition of a date stamp, distinction among full color/black and white/gray, and a storage file format.

As described above, in the information processing system 10 according to the first embodiment, the user can operate the scanner device 20 after setting the sheet on the scanner device 20 to cause the driver unit 32 of the information processing device 30 to control the scanner device 20. That is, after setting the sheet on the scanner device 20, the user can control scan using the driver unit 32 of the information processing device 30 without moving to the information processing device 30. Accordingly, the information processing system 10 according to the first embodiment can reduce labor of the user for performing operation.

Second Embodiment

Figure 5:
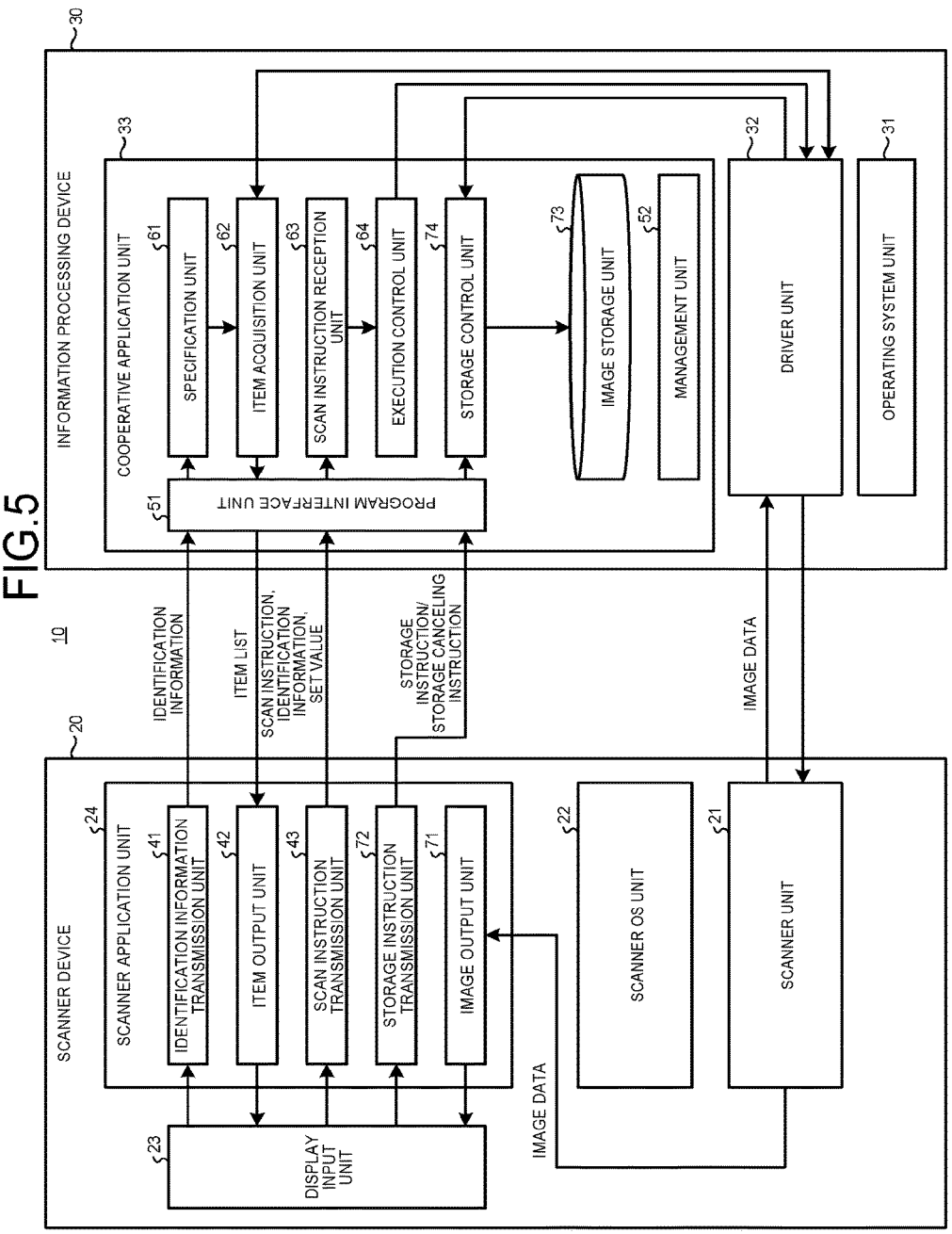
FIG. 5 is a diagram illustrating a functional configuration of a scanner device and an information processing device according to a second embodiment.

FIG. 5 is a diagram illustrating a functional configuration of the scanner device 20 and the information processing device 30 according to a second embodiment. The information processing system 10 according to the second embodiment has substantially the same configuration and function as those in the first embodiment, so that a component having substantially the same configuration and function is denoted by the same reference numeral, and description thereof will not be repeated except differences.

In the second embodiment, the scanner application unit 24 further includes an image output unit 71 and a storage instruction transmission unit 72. The cooperative application unit 33 further includes an image storage unit 73 and a storage control unit 74.

In the second embodiment, the scanner unit 21 gives image data generated by scanning to the image output unit 71 of the scanner application unit 24. The image output unit 71 receives the image data generated by scanning from the scanner unit 21, and causes the display input unit 23 to display the received image data. Due to this, the user can check the image data generated by scanning. The image output unit 71 causes the display input unit 23 to display a select button and the like, and causes the user to select whether to store the image data generated by scanning.

If the user selects to store the image data, the storage instruction transmission unit 72 transmits a storage instruction to the cooperative application unit 33 via the communication path. If the user selects not to store the image data, the storage instruction transmission unit 72 transmits a storage canceling instruction to the cooperative application unit 33 via the communication path.

The scanner unit 21 transmits the image data generated by scanning to the driver unit 32 via the communication path. The driver unit 32 receives the image data from the scanner unit 21, and gives the image data to the storage control unit 74.

The image storage unit 73 stores therein the image data generated by scanning. The storage control unit 74 controls whether to store the image data received by the driver unit 32 from the scanner unit 21 in the image storage unit 73. More specifically, when receiving the storage instruction from the scanner application unit 24 of the scanner device 20 as the transmission source of the identification information via the communication path and the program interface unit 51, the storage control unit 74 causes the image storage unit 73 to store the image data received by the driver unit 32. In contrast, when receiving the storage canceling instruction from the scanner application unit 24 of the scanner device 20 via the communication path and the program interface unit 51, the storage control unit 74 discards the image data received by the driver unit 32 not to be stored in the image storage unit 73.

The image storage unit 73 may be arranged at any place which the cooperative application unit 33 can access. For example, the image storage unit 73 may be arranged in a server and the like on a network.

Figure 6:
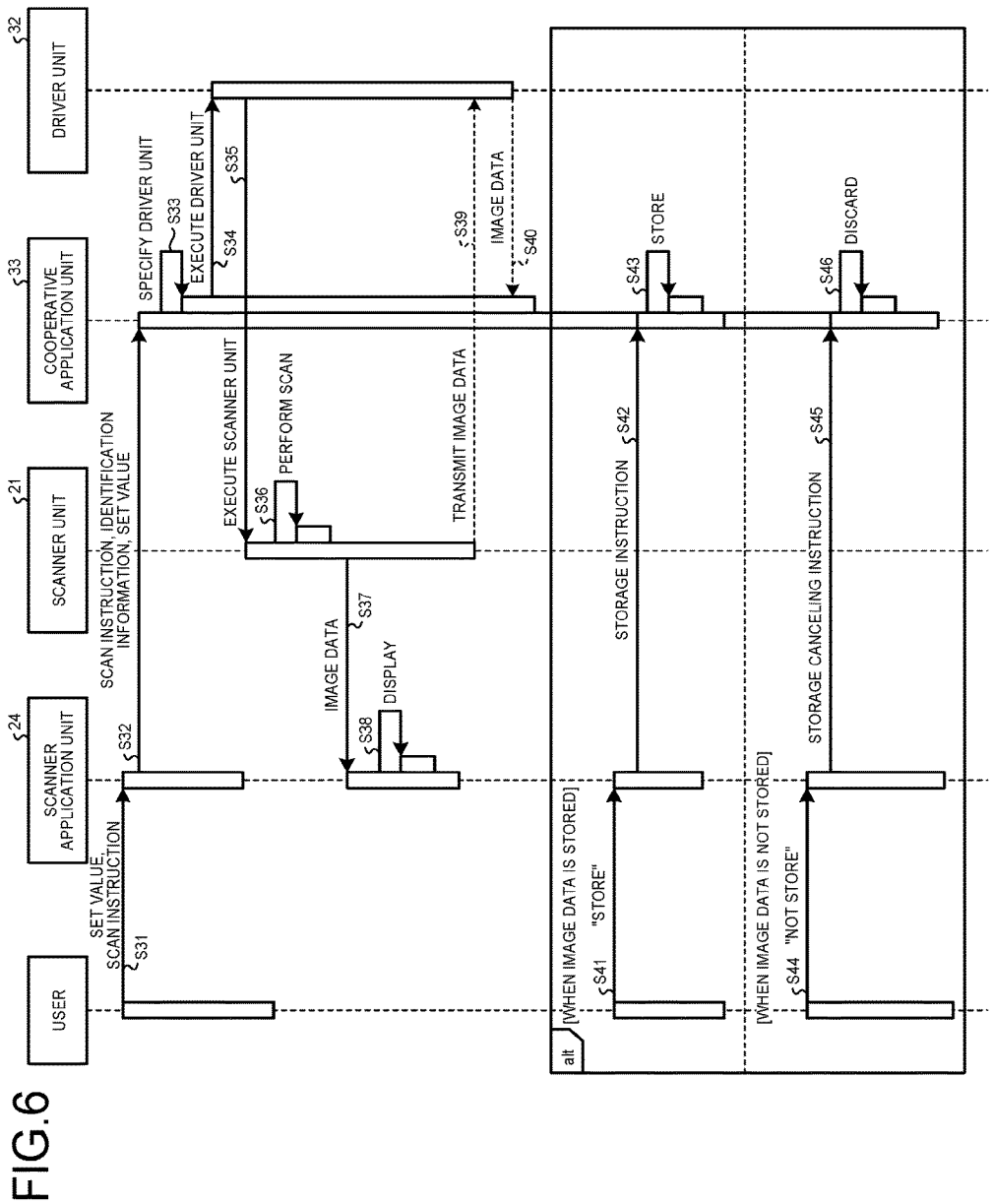
FIG. 6 is a sequence diagram of an information processing system according to the second embodiment.

FIG. 6 is a sequence diagram of the information processing system 10 according to the second embodiment. The information processing system 10 according to the second embodiment performs processing through a sequence similar to that in FIG. 3 of the first embodiment. Subsequently, the information processing system 10 according to the second embodiment performs processing through the sequence illustrated in FIG. 6.

After the list of items is displayed, the user operates the scanner device 20 to input the set value for each item. When the set values are completely input, the user operates the scanner device 20 to give the scan instruction to the scanner application unit 24 (S31).

When receiving the scan instruction from the user, the scanner application unit 24 transmits the identification information and the set value corresponding to each item, together with the scan instruction, to the cooperative application unit 33 (S32). When receiving the scan instruction, the cooperative application unit 33 specifies the driver unit 32 that controls the scanner device 20 identified by the identification information (S33). The cooperative application unit 33 then gives an execution instruction and the set value for each item to the specified driver unit 32 (S34).

When receiving the execution instruction, the driver unit 32 controls the scanner unit 21 in accordance with the set values, and executes the scanner unit 21 (S35). The scanner unit 21 then performs scan of the set sheet in accordance with control performed by the driver unit 32 (S36).

Figure 7:
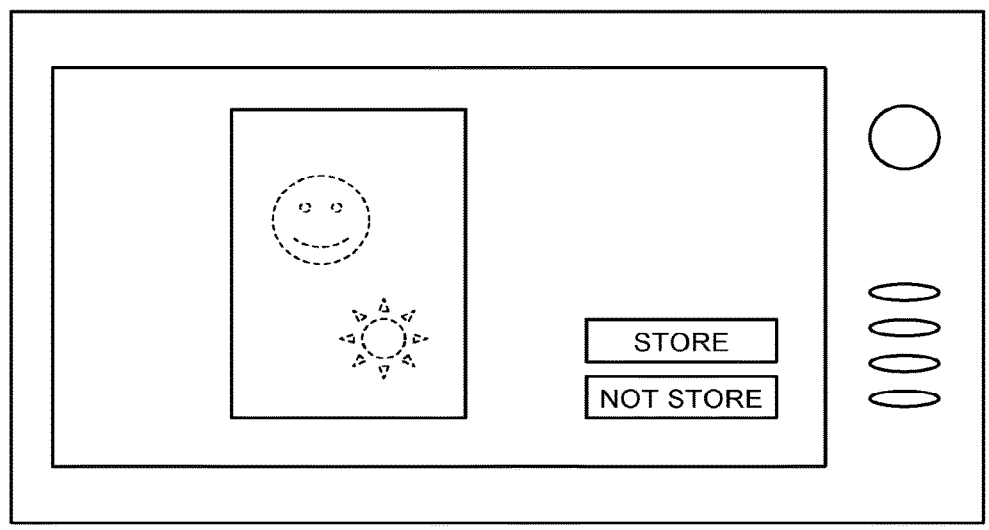
FIG. 7 is a diagram illustrating an example of an image displayed on the scanner device according to the second embodiment.

Subsequently, the scanner unit 21 gives the image data generated by scanning to the scanner application unit 24 (S37). The scanner application unit 24 then causes the display input unit 23 to display a button by which the user selects whether to store the received image data and the image data generated by scanning, or to cancel storage (S38). For example, the scanner application unit 24 displays the image as illustrated in FIG. 7.

The scanner unit 21 transmits the image data generated by scanning to the driver unit 32 (S39). The driver unit 32 then gives the received image data to the cooperative application unit 33 (S40).

The user checks the image data displayed on the display input unit 23, and selects whether to store the image data. If the user selects to store the image data (S41), the scanner application unit 24 transmits the storage instruction to the cooperative application unit 33 (S42). When receiving the storage instruction from the scanner application unit 24, the cooperative application unit 33 causes the image storage unit 73 to store therein the image data received from the driver unit 32 (S43).

If the user selects not to store the image data (S44), the scanner application unit 24 transmits the storage canceling instruction to the cooperative application unit 33 (S45). When receiving the storage canceling instruction from the scanner application unit 24, the cooperative application unit 33 discards the image data received from the driver unit 32 (S46).

Table 2 below is an example of the requests for WebAPI from the scanner application unit 24 to the program interface unit 51 in the sequence illustrated in FIG. 6. In the second embodiment, the requests in Table 2 below are used in addition to the requests and the responses used in the first embodiment.

TABLE 2

| Sequence No. | Request/Response | Example |
|---|---|---|
| S42<br>Storage<br>instruction | Request | POST /scan/result HTTP/1.1<br>Host: 10.20.30.40:80<br>save=true<br>filename=20140808_conference_material1 |
| S45<br>Storage<br>canceling<br>instruction | Request | POST /scan/result HTTP/1.1<br>Host: 10.20.30.40:80<br>save=false<br>filename=20140808_conference_material1 |

Storage instruction at S42 is a request such that the scanner application unit 24 instructs the program interface unit 51 to store the image data having a designated file name. "filename=20140808_conference_material1" represents a file name to be stored.

The storage canceling instruction at S45 is a request such that the scanner application unit 24 instructs the program interface unit 51 to discard the image data having a designated file name. "filename=20140808_conference_material1" represents a file name to be discarded.

As described above, the information processing system 10 according to the second embodiment can display the image data generated by scanning, and cause the user to select whether to store the image data. Due to this, the information processing system 10 according to the second embodiment can cause the user to check the scanned image data.

Third Embodiment

Figure 8:
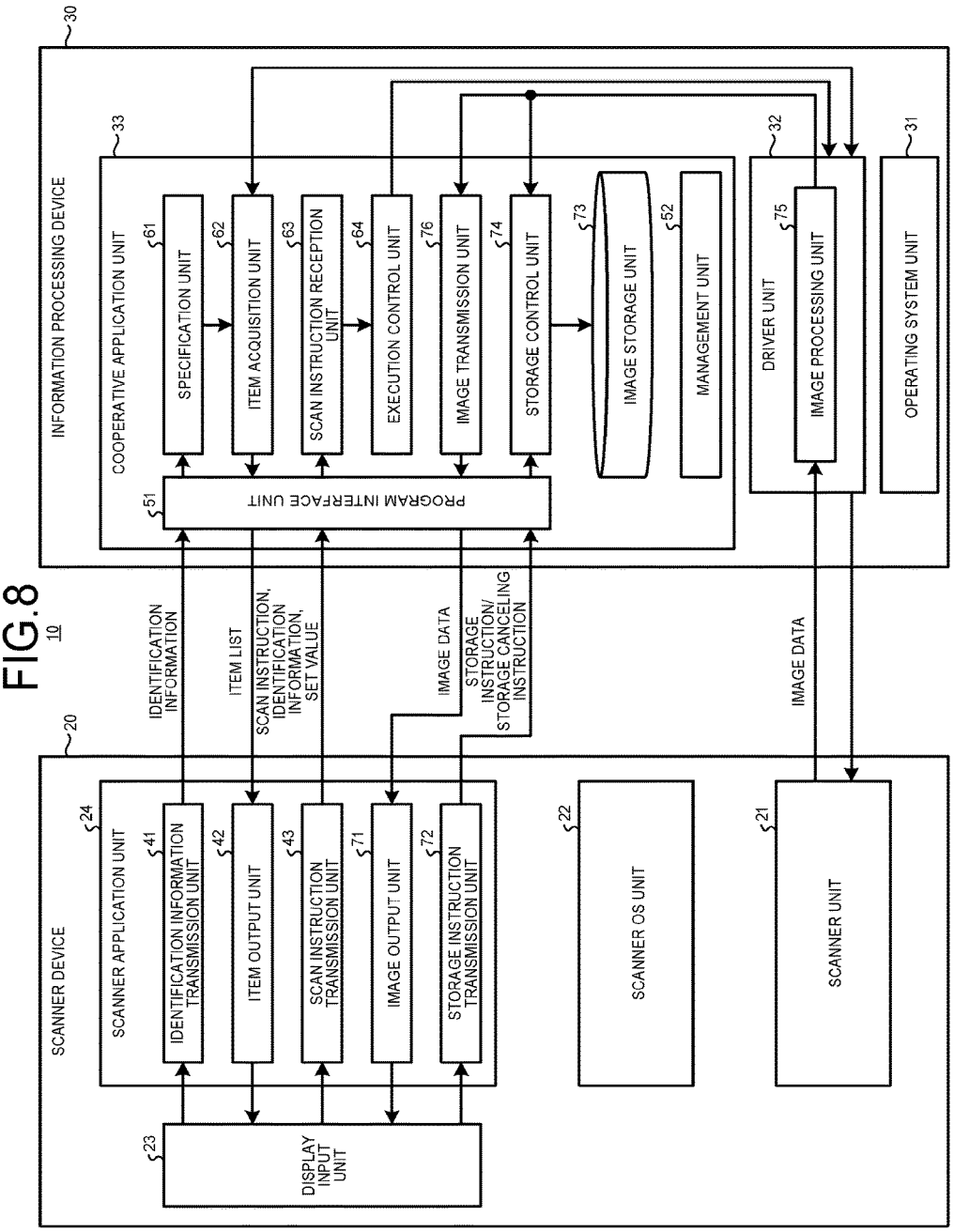
FIG. 8 is a diagram illustrating a functional configuration of a scanner device and an information processing device according to a third embodiment.

FIG. 8 is a diagram illustrating a functional configuration of the scanner device 20 and the information processing device 30 according to a third embodiment. The information processing system 10 according to the third embodiment has substantially the same configuration and function as those in the second embodiment, so that a component having substantially the same configuration and function is denoted by the same reference numeral, and description thereof will not be repeated except differences.

In the third embodiment, the driver unit 32 includes an image processing unit 75. The cooperative application unit 33 further includes an image transmission unit 76.

The image processing unit 75 of the driver unit 32 performs image processing on the image data received from the scanner unit 21 in accordance with the set values input by the user. By way of example, when the set value regarding whether to perform color matching is ON, the image processing unit 75 performs color matching. By way of example, when the set value of date stamp is ON, the image processing unit 75 performs processing of working the image data to embed date information in the image. The image processing unit 75 gives the image data after image processing to the storage control unit 74 and the image transmission unit 76.

The image transmission unit 76 transmits the image data on which image processing is performed by the driver unit 32 to the scanner device 20 as the transmission source of the identification information via the program interface unit 51 and the communication path. In the third embodiment, in place of receiving the image data from the scanner unit 21, the image output unit 71 of the scanner application unit 24 receives the image data as a response to a scanned image acquisition request from the cooperative application unit 33 via the communication path. Due to this, the user can check the data obtained by performing image processing on the image data generated by scanning.

Figure 9:
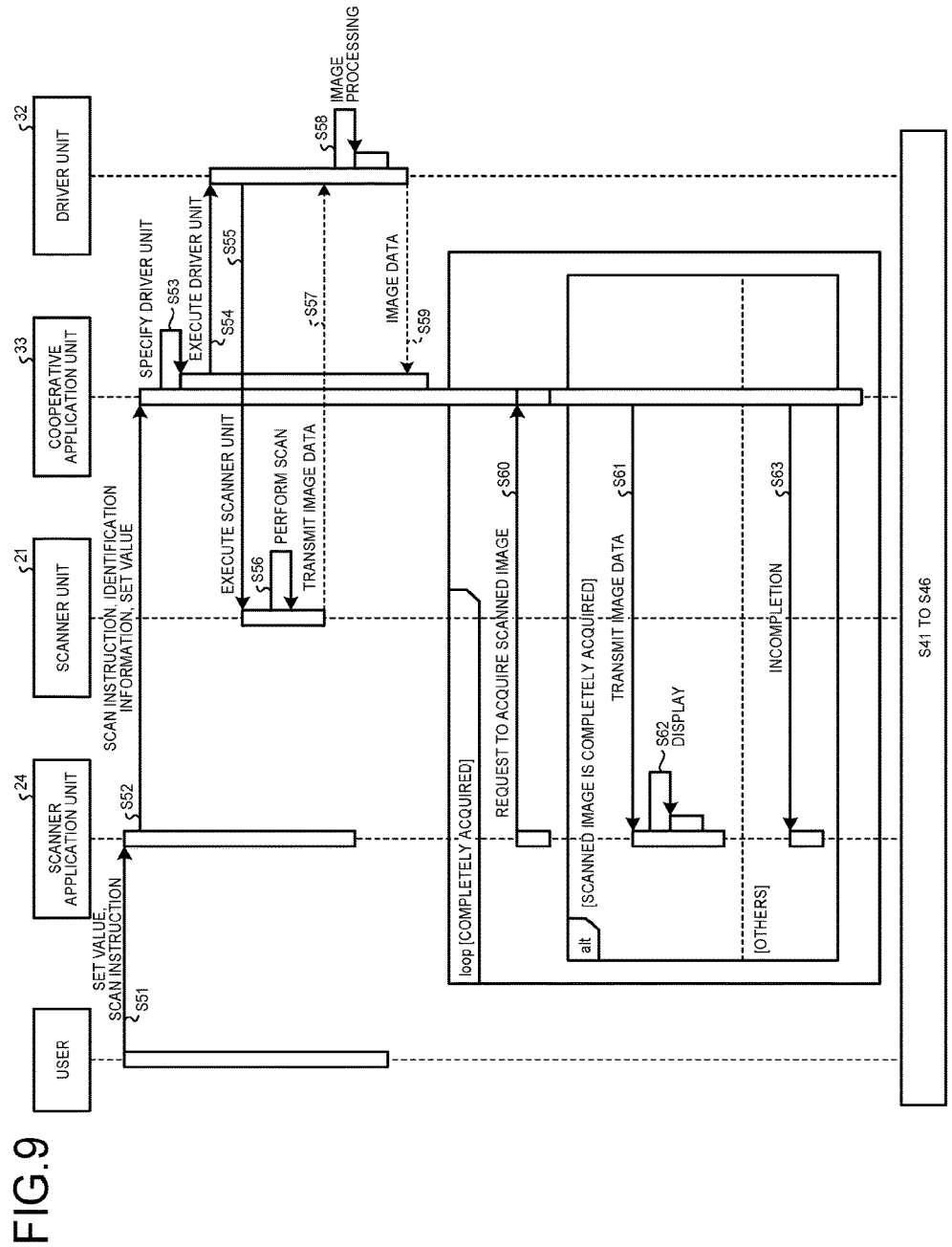
FIG. 9 is a sequence diagram of an information processing system according to the third embodiment.

FIG. 9 is a sequence diagram of the information processing system 10 according to the third embodiment. The information processing system 10 according to the third embodiment performs processing through a sequence similar to that in FIG. 3 of the first embodiment. Subsequently, the information processing system 10 according to the third embodiment performs processing through the sequence illustrated in FIG. 9.

First, at Step S51 to Step S56, the same processing as that at Step S31 to Step S36 in FIG. 6 is performed. Subsequently, the scanner unit 21 transmits the image data generated by scanning to the driver unit 32 (S57). The driver unit 32 then receives the image data from the scanner unit 21, and performs image processing on the received image data in accordance with the set values (S58). Next, the driver unit 32 gives the image data after image processing to the cooperative application unit 33 (S59).

Figure 10:
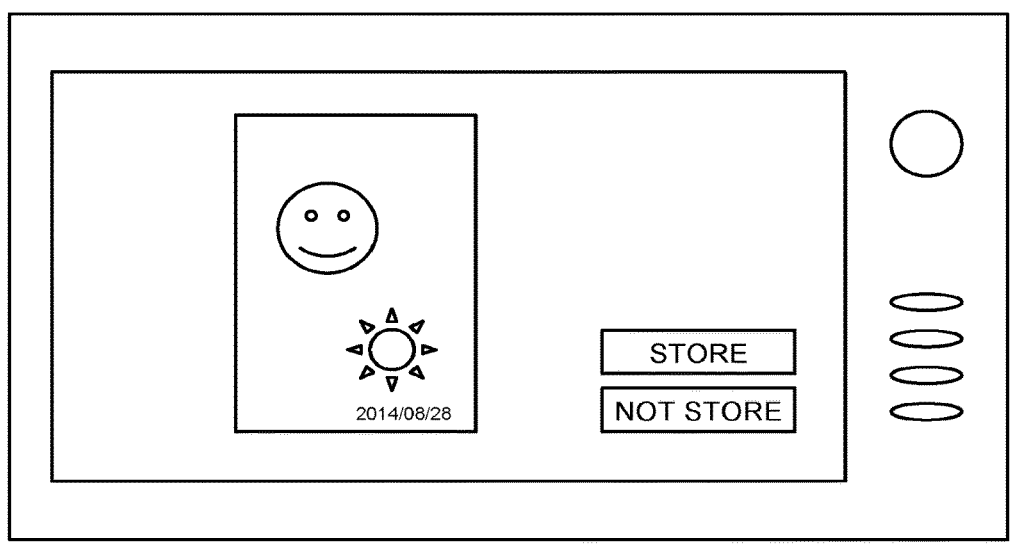
FIG. 10 is a diagram illustrating an example of an image displayed on the scanner device according to the third embodiment.

After transmitting the scan instruction to the cooperative application unit 33, the scanner application unit 24 transmits the scanned image acquisition request to the cooperative application unit 33 (S60). If the cooperative application unit 33 has already completely acquired the image data from the driver unit 32 when receiving the scanned image acquisition request, the cooperative application unit 33 transmits the image data to the scanner application unit 24 (S61). Subsequently, the scanner application unit 24 causes the display input unit 23 to display a button by which the user selects whether to store the received image data and the image data generated by scanning, or to cancel storage (S62). For example, the scanner application unit 24 displays the image as illustrated in FIG. 10.

If the cooperative application unit 33 has not completely acquired the image data from the driver unit 32 yet when receiving the scanned image acquisition request, the cooperative application unit 33 transmits the notification of incompletion to the scanner application unit 24 (S63). When receiving the notification of incompletion, the scanner application unit 24 transmits the scanned image acquisition request to the cooperative application unit 33 again (S60), and repeats the processing until receiving the image data.

Thereafter, the information processing system 10 according to the third embodiment performs the same processing as that at Step S41 to Step S46 in FIG. 6.

Table 3 below is an example of the requests for WebAPI and the responses between the scanner application unit 24 and the program interface unit 51 in the sequence illustrated in FIG. 9. In the third embodiment, the request and responses in Table 3 below are used in addition to the requests and the responses used in the second embodiment.

TABLE 3

| Sequence No. | Request/Response | Example |
| --- | --- | --- |
| S60 Scanned image acquisition request | Request | GET /scan/image HTTP/1.1 Host: 10.20.30.40:80 filename=20140808_conference_material1 |
| S61 Transmission of scanned image | Response | HTTP/1.1 200 OK Content-Type: image/jpeg <result> image data </result> |
| S63 Incompletion | Response | HTTP/1.1 200 OK Content-Type: text/plain; charset=utf-8 <?xml version="1.0" encoding="UTF-8"?> <result> Not Completed </result> |

Scanned image acquisition request at S60 is a request such that the scanner application unit 24 requests the program interface unit 51 to acquire the image data generated by scanning. "filename=20140808_conference_material1" represents a file name of a target.

Transmission of the scanned image at S61 is a response such that the program interface unit 51 transmits the image data generated by scanning to the scanner application unit 24. Target image data (for example, JPEG data) is inserted between "<result>" and "</result>".

Incompletion at S63 is a response such that the program interface unit 51 notifies the scanner application unit 24 that the image data is not completely acquired.

As described above, the information processing system 10 according to the third embodiment can display the image data generated by scanning on which image processing is performed, and cause the user to select whether to store the image data. Due to this, the information processing system 10 according to the third embodiment can cause the user to check the image data generated by scanning on which image processing is performed.

Fourth Embodiment

Figure 11:
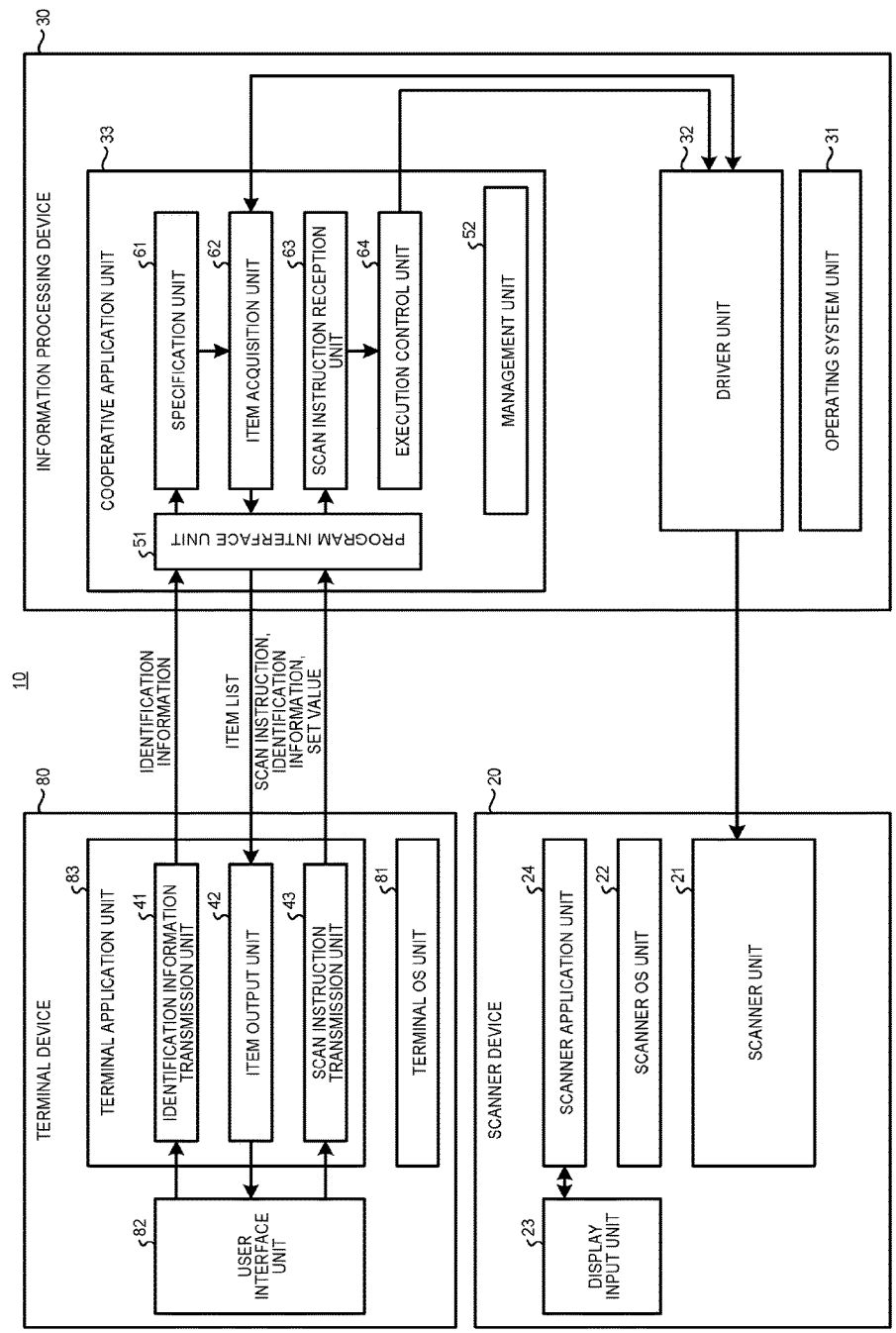
FIG. 11 is a diagram illustrating a functional configuration of a scanner device, an information processing device, and a terminal device according to a fourth embodiment.

FIG. 11 is a diagram illustrating a functional configuration of the scanner device 20, the information processing device 30, and a terminal device 80 according to a fourth embodiment. The information processing system 10 according to the fourth embodiment has substantially the same configuration and function as those in the first embodiment, so that a component having substantially the same configuration and function is denoted by the same reference numeral, and description thereof will not be repeated except differences.

The information processing system 10 according to the fourth embodiment further includes the terminal device 80 that is different from the scanner device 20. The terminal device 80 is a device that can be carried by the user. The terminal device 80 is a computer having a data input function, a data display function, and a data communication function. The terminal device 80 may be a portable terminal such as a smartphone, a tablet, and a mobile phone. The terminal device 80 can be connected to the information processing device 30 via a wireless communication path.

The terminal device 80 includes a terminal OS unit 81, a user interface unit 82, and a terminal application unit 83. The terminal OS unit 81 manages and controls the entire terminal device 80. The terminal OS unit 81 is implemented when the processor executes the operating system. The operating system is, for example, a general-purpose computer program for a mobile device such as Android (registered trademark).

The user interface unit 82 provides a user interface to the user via a liquid crystal monitor and the like. The user interface unit 82 displays information to the user, and receives information input by the user.

The terminal application unit 83 controls exchange of information between itself and the information processing device 30, display of information on the user interface unit 82, and input of information from the user interface unit 82, and performs setting for causing the information processing device 30 to control the scanner unit 21. The terminal application unit 83 is implemented when the processor executes a terminal application program on the operating system.

The terminal application unit 83 includes a configuration similar to that of the scanner application unit 24 according to the first embodiment. That is, the terminal application unit 83 includes the identification information transmission unit 41, the item output unit 42, and the scan instruction transmission unit 43.

The scanner application unit 24 of the scanner device 20 has a function of displaying the identification information (for example, a device name) in accordance with an operation performed by the user. In the fourth embodiment, the scanner device 20 does not necessarily include the scanner OS unit 22 and the scanner application unit 24 so long as the scanner device 20 has a function of displaying an identification device (for example, a device name).

Figure 12:
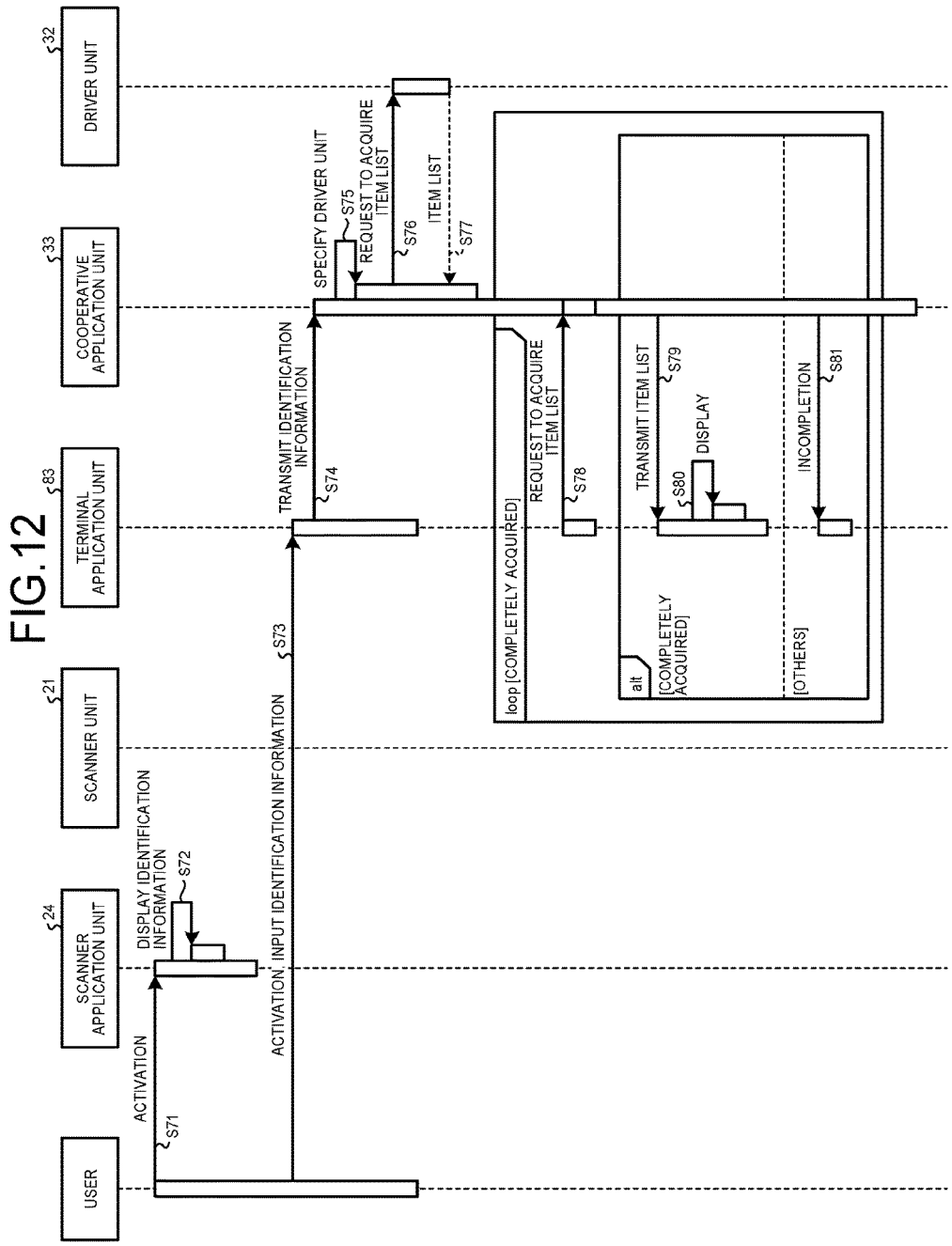
FIG. 12 is a sequence diagram of an information processing system according to the fourth embodiment.
Figure 13:
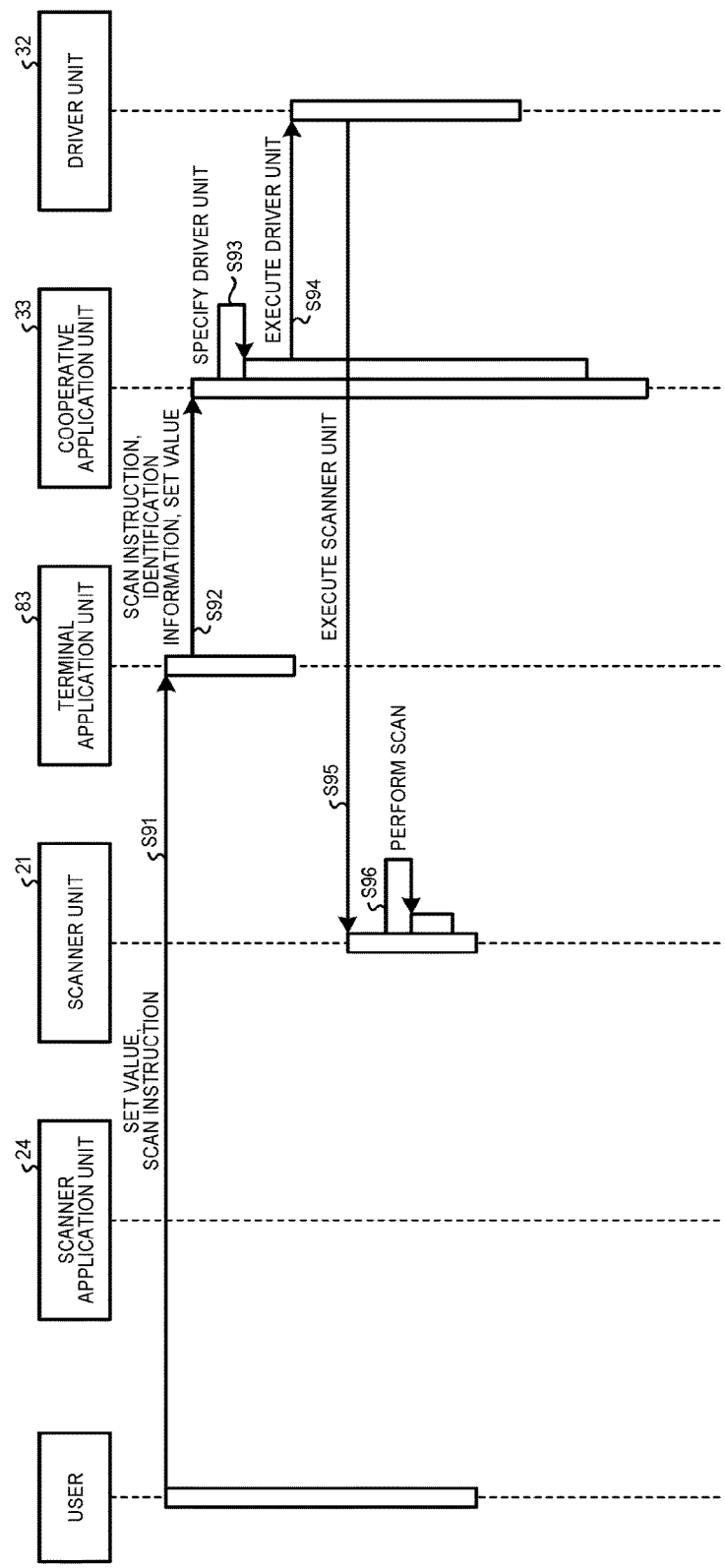
FIG. 13 is a sequence diagram subsequent to FIG. 12.

FIG. 12 is a sequence diagram of the information processing system 10 according to the fourth embodiment. FIG. 13 is a sequence diagram subsequent to FIG. 12. The information processing system 10 according to the fourth embodiment performs processing through the sequence illustrated in FIGS. 12 and 13.

First, after setting a sheet and the like on the scanner device 20, the user operates the scanner device 20 to activate the scanner application unit 24 (S71). When being activated by the user, the scanner application unit 24 displays the identification information (for example, a device name) for identifying the scanner device 20 (S72).

Subsequently, the user operates the terminal device 80 to activate the terminal application unit 83, and inputs the identification information displayed on the scanner device 20 to the terminal application unit 83 (S73). When being activated by the user and receiving the input identification information, the terminal application unit 83 transmits the identification information to the cooperative application unit 33 (S74).

When receiving the identification information, the cooperative application unit 33 specifies the driver unit 32 that controls the scanner device 20 identified by the identification information (S75). Subsequently, the cooperative application unit 33 requests the specified driver unit 32 for the list of items that can be set for the specified driver unit 32 to control the scanner device (S76), and acquires the list from the driver unit 32 (S77).

On the other hand, after transmitting the identification information to the cooperative application unit 33, the terminal application unit 83 transmits the item list acquisition request to the cooperative application unit 33 (S78). If the cooperative application unit 33 has already completely acquired the list from the driver unit 32 when receiving the item list acquisition request, the cooperative application unit 33 transmits the list of items to the terminal application unit 83 (S79). The terminal application unit 83 then displays the acquired list of items (S80). If the cooperative application unit 33 has not completely acquired the list from the driver unit 32 yet when receiving the item list acquisition request, the cooperative application unit 33 transmits the notification of incompletion to the terminal application unit 83 (S81). When receiving the notification of incompletion, the terminal application unit 83 transmits the item list acquisition request to the cooperative application unit 33 again (S78), and repeats the processing until receiving the list of items.

When the list of items is displayed, the user operates the terminal device 80 to input the set value for each item. When the set values are completely input, the user operates the terminal device 80 to give the scan instruction to the terminal application unit 83 (S91).

When receiving the scan instruction from the user, the terminal application unit 83 transmits the identification information and the set value for each item, together with the scan instruction, to the cooperative application unit 33 (S92). When receiving the scan instruction, the cooperative application unit 33 specifies the driver unit 32 that controls the scanner device 20 identified by the identification information (S93). The cooperative application unit 33 gives the execution instruction and the set value for each item to the specified driver unit 32 (S94).

When receiving the execution instruction, the driver unit 32 controls the scanner unit 21 in accordance with the set values, and executes the scanner unit 21 (S95). The scanner unit 21 then performs scan of the set sheet in accordance with control performed by the driver unit 32 (S96).

As described above, in the information processing system 10 according to the fourth embodiment, the scanner device 20 can be controlled by the driver unit 32 of the information processing device 30 by operating the terminal device 80 in place of operating the scanner device 20. Accordingly, the information processing system 10 according to the fourth embodiment can reduce labor of the user for performing operation.

In the fourth embodiment, the requests for WebAPI and the responses between the terminal application unit 83 and the program interface unit 51 are the same as those in the first embodiment. The terminal application unit 83 may have a configuration similar to that of the scanner application unit 24 according to the third embodiment. In this case, the terminal device 80 can display the image data generated by scanning on which image processing is performed, and cause the user to select whether to store the image data.

Fifth Embodiment

Figure 14:
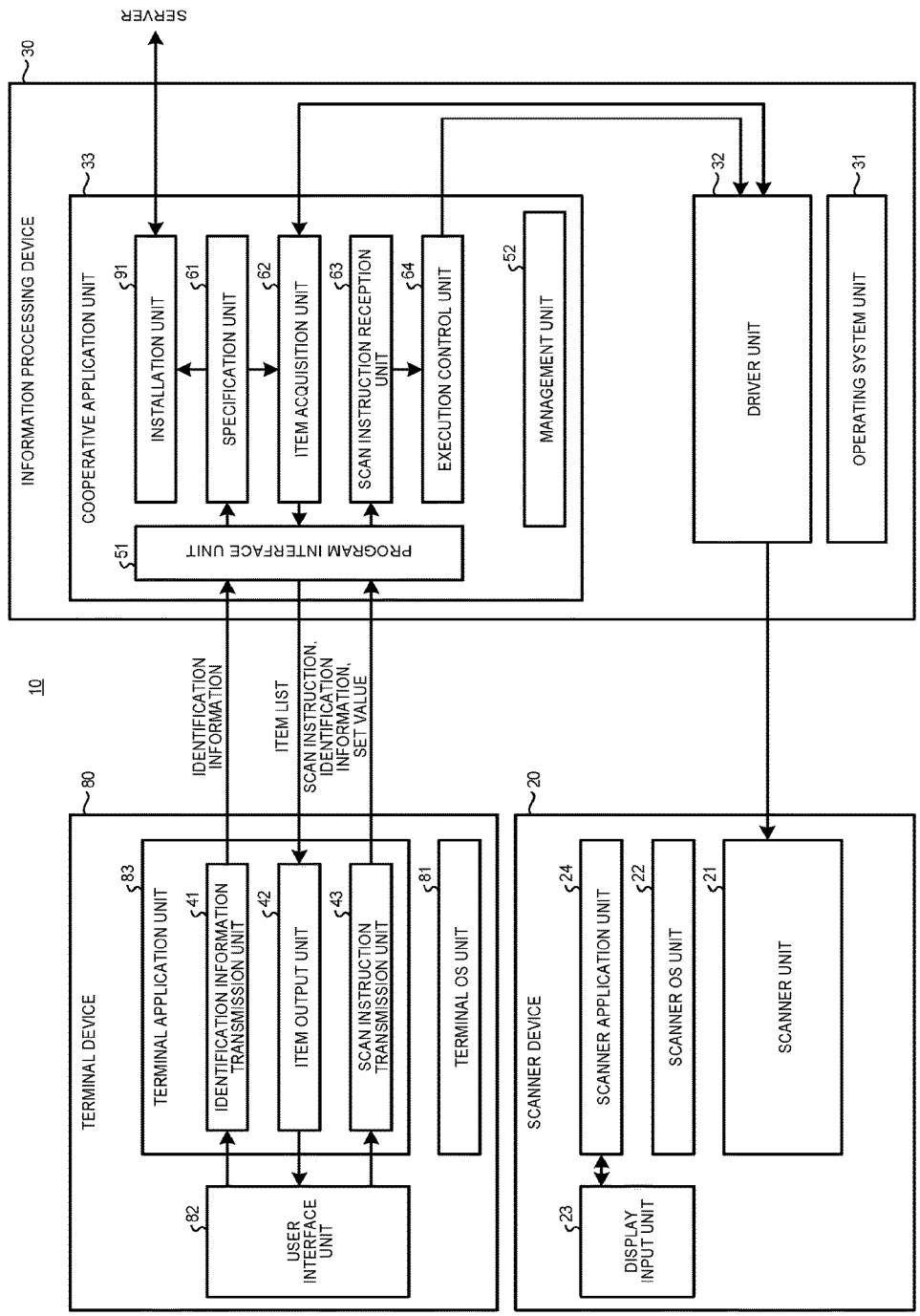
FIG. 14 is a diagram illustrating a functional configuration of a scanner device, an information processing device, and a terminal device according to a fifth embodiment.

FIG. 14 is a diagram illustrating a functional configuration of the scanner device 20, the information processing device 30, and the terminal device 80 according to a fifth embodiment. The information processing system 10 according to the fifth embodiment has substantially the same configuration and function as those in the fourth embodiment, so that a component having substantially the same configuration and function is denoted by the same reference numeral, and description thereof will not be repeated except differences.

The cooperative application unit 33 according to the fifth embodiment further includes an installation unit 91. When the information processing device 30 does not include the driver unit 32 corresponding to the scanner device 20 identified by the identification information, the installation unit 91 downloads a corresponding driver program from an external server via a network. The installation unit 91 installs the downloaded driver program in the information processing device 30 to cause the information processing device 30 to include the corresponding driver unit 32.

Figure 15:
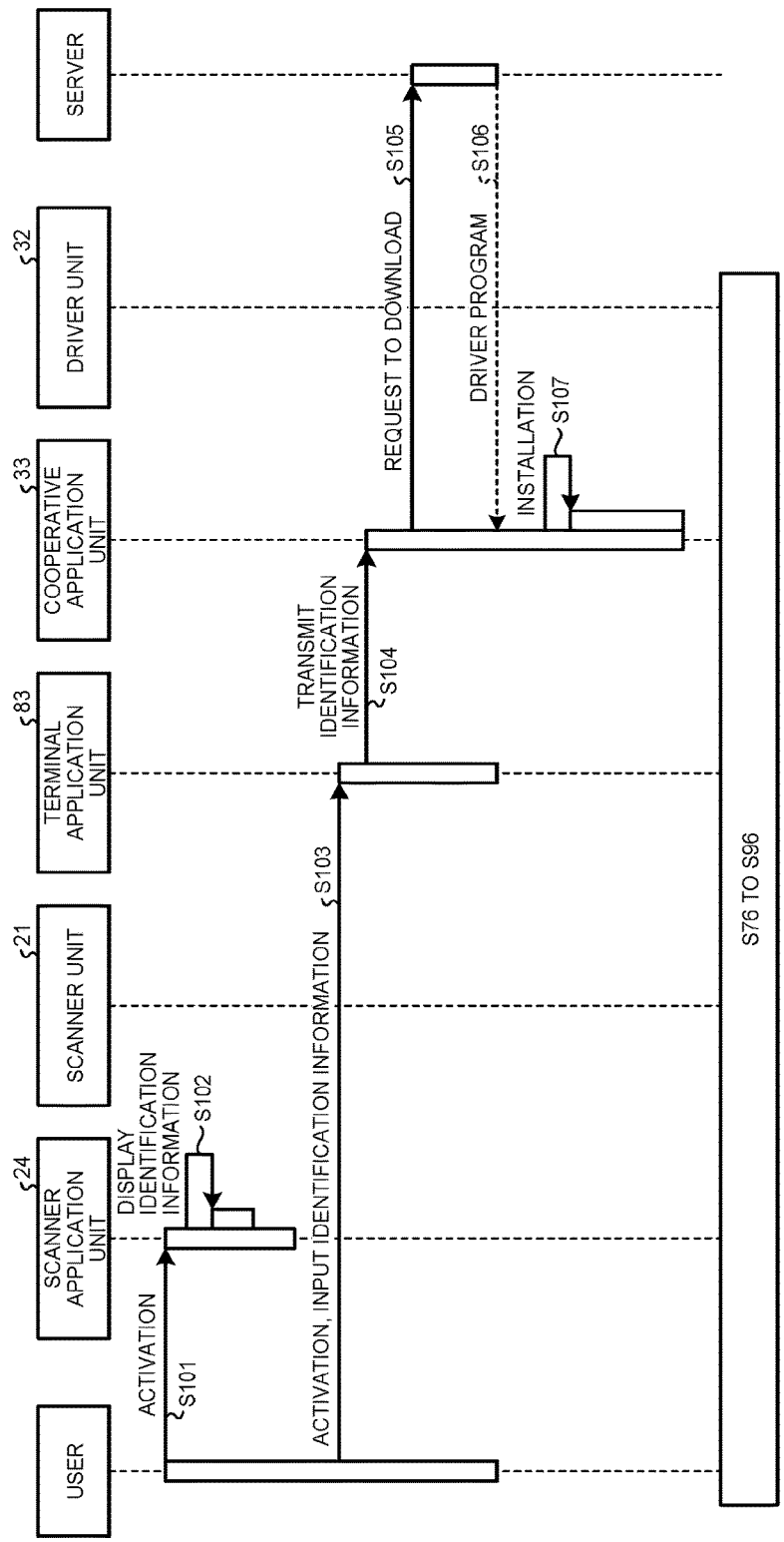
FIG. 15 is a sequence diagram of an information processing system according to the fifth embodiment.

FIG. 15 is a sequence diagram of the information processing system 10 according to the fifth embodiment. The information processing system 10 according to the fifth embodiment performs processing through the sequence illustrated in FIG. 15.

First, after setting a sheet and the like on the scanner device 20, the user operates the scanner device 20 to activate the scanner application unit 24 (S101). When being activated by the user, the scanner application unit 24 displays the identification information (for example, a device name) for identifying the scanner device 20 (S102).

Subsequently, the user operates the terminal device 80 to activate the terminal application unit 83, and inputs the identification information displayed on the scanner device 20 to the terminal application unit 83 (S103). When being activated by the user and receiving the input identification information, the terminal application unit 83 transmits the identification information to the cooperative application unit 33 (S104).

When receiving the identification information, the cooperative application unit 33 determines whether the driver unit 32 that controls the scanner device 20 identified by the identification information is present. If the driver unit 32 that controls the scanner device 20 identified by the identification information is not present, the cooperative application unit 33 accesses the external server via the network and transmits a download request (S105). The cooperative application unit 33 then downloads the corresponding driver program from the server (S106).

When the download is completed, the cooperative application unit 33 installs the downloaded driver program in the information processing device 30 (S107). Due to this, the information processing device 30 can include the driver unit 32 that controls the scanner device 20 identified by the identification information.

Thereafter, the information processing system 10 according to the fifth embodiment performs the same processing as that at Step S76 to Step S96 in FIG. 12 and FIG. 13.

As described above, in the information processing system 10 according to the fifth embodiment, even when the information processing device 30 does not include the driver unit 32 for controlling the scanner device 20, the corresponding driver program can be downloaded from the server to be installed. Accordingly, the information processing system 10 according to the fifth embodiment can reduce labor of the user for downloading and installing the driver program.

Sixth Embodiment

Figure 16:
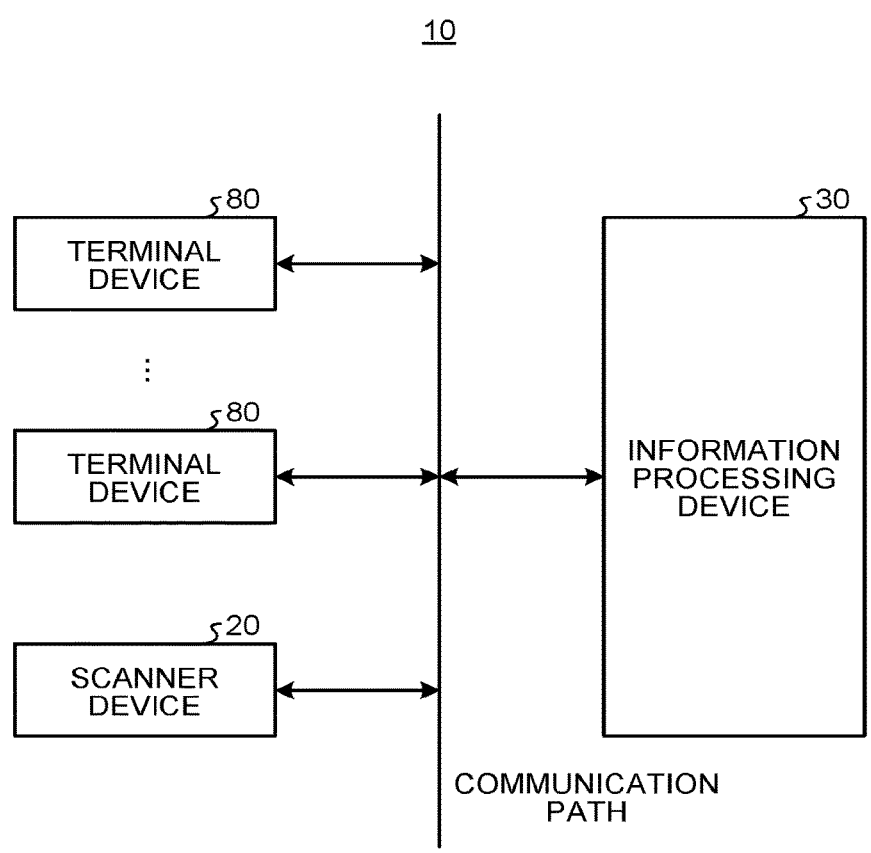
FIG. 16 is a diagram illustrating a configuration of an information processing system according to a sixth embodiment.

FIG. 16 is a diagram illustrating a configuration of the information processing system 10 according to a sixth embodiment. The information processing system 10 according to the sixth embodiment has substantially the same configuration and function as those in the fourth embodiment, so that a component having substantially the same configuration and function is denoted by the same reference numeral, and description thereof will not be repeated except differences.

The information processing system 10 includes the scanner device 20, a plurality of terminal devices 80, and the information processing device 30. The respective terminal devices 80 are operated by different users. Each of the terminal devices 80 can be connected to the information processing device 30 via a wireless communication path. The terminal devices 80 have the same function and configuration.

The information processing system 10 according to the sixth embodiment can cause each user to control the scanner device 20 by using the terminal device 80 held by himself/herself.

Figure 17:
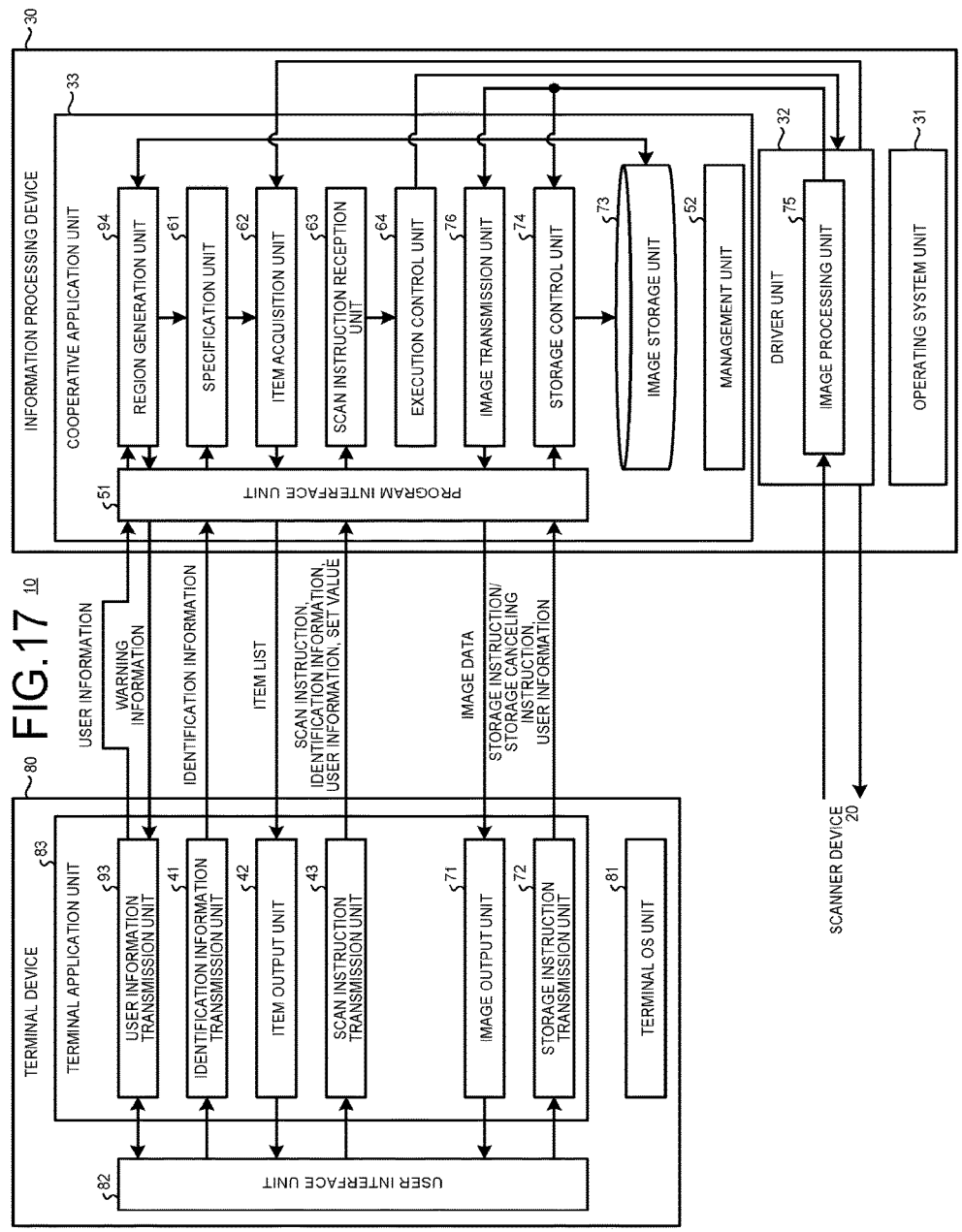
FIG. 17 is a diagram illustrating a functional configuration of a terminal device and an information processing device according to the sixth embodiment.

FIG. 17 is a diagram illustrating a functional configuration of the terminal device 80 and the information processing device 30 according to the sixth embodiment.

The terminal application unit 83 of the terminal device 80 further includes the image output unit 71, the storage instruction transmission unit 72, and a user information transmission unit 93. The cooperative application unit 33 of the information processing device 30 further includes the image storage unit 73, the storage control unit 74, the image transmission unit 76, and a region generation unit 94. The driver unit 32 further includes the image processing unit 75.

Each of the image output unit 71, the storage instruction transmission unit 72, the image storage unit 73, the storage control unit 74, the image processing unit 75, and the image transmission unit 76 has substantially the same function and configuration as those in the third embodiment illustrated in FIG. 8. Thus, description thereof will not be repeated except differences.

The user information transmission unit 93 transmits, for example, user information for identifying the user who uses the terminal device 80 to the cooperative application unit 33 via the communication path before the scan instruction (for example, when the user gives the activation instruction). An example of the user information is a user name. The user information may be an arbitrary number, character, combination of numbers and characters determined by the user, and the like.

Before the scan instruction, the region generation unit 94 receives the user information from the user information transmission unit 93 of the terminal application unit 83 via the communication path and the program interface unit 51. The region generation unit 94 then generates a storage region corresponding to the received user information in the image storage unit 73. The storage region corresponding to the user information is, for example, a folder having a name of user information (for example, a user name).

When receiving the user information before the scan instruction, the region generation unit 94 determines whether the storage region corresponding to the user information is generated in the image storage unit 73. If the storage region corresponding to the user information received before the scan instruction is not generated in the image storage unit 73 yet, the region generation unit 94 generates the storage region corresponding to the user information (for example, a folder having a name of user information (for example, a user name)) in the image storage unit 73.

If the storage region corresponding to the user information received before the scan instruction has already been generated in the image storage unit 73, the region generation unit 94 transmits warning information to the terminal device 80 via the program interface unit 51 and the communication path without generating the storage region corresponding to the user information in the image storage unit 73.

The user information transmission unit 93 receives the warning information from the region generation unit 94 of the cooperative application unit 33 via the program interface unit 51 and the communication path. When receiving the warning information, the user information transmission unit 93 inquires of the user whether to change the user information via the user interface unit 82. If the user information is changed, the user information transmission unit 93 transmits new user information to the region generation unit 94 via the communication path and the program interface unit 51. If the user information is not changed, the user information transmission unit 93 transmits the same user information to the region generation unit 94 via the communication path and the program interface unit 51.

When receiving, after transmitting the warning information, new user information that is different from the user information received before transmitting the warning information from the user information transmission unit 93 of the terminal application unit 83, the region generation unit 94 generates a storage region corresponding to the new user information in the image storage unit 73. When receiving, after transmitting the warning information, the same user information as the user information received before transmitting the warning information from the user information transmission unit 93 of the terminal application unit 83, the region generation unit 94 does not generate the storage region corresponding to the user information in the image storage unit 73.

The scan instruction transmission unit 43 transmits, together with the scan instruction, the identification information, the user information, and the set value for each item to the cooperative application unit 33 via the communication path.

The scan instruction reception unit 63 receives, together with the scan instruction, the identification information, the user information, and the set value for each item from the scan instruction transmission unit 43 of the terminal application unit 83 via the communication path and the program interface unit 51. The scan instruction reception unit 63 then gives the scan instruction to the execution control unit 64.

The image transmission unit 76 transmits the image data on which image processing is performed by the driver unit 32 to the terminal device 80 as the transmission source of the identification information via the program interface unit 51 and the communication path. The image output unit 71 of the terminal application unit 83 receives the image data as a response to the scanned image acquisition request from the cooperative application unit 33.

The image output unit 71 causes the user interface unit 82 to display the received image data. Due to this, the user can check the image data generated by scanning. The image output unit 71 causes the user interface unit 82 to display a select button and the like, and causes the user to select whether to store the image data generated by scanning.

If the user selects to store the image data, the storage instruction transmission unit 72 transmits the storage instruction and the user information to the cooperative application unit 33 via the communication path. If the user selects not to store the image data, the storage instruction transmission unit 72 transmits the storage canceling instruction and the user information to the cooperative application unit 33 via the communication path.

When receiving the storage instruction from the terminal application unit 83 of the terminal device 80 via the communication path and the program interface unit 51, the storage control unit 74 causes the image data received by the driver unit 32 to be stored in the storage region corresponding to the user information received with the scan instruction in the image storage unit 73. In contrast, when receiving the storage canceling instruction from the terminal application unit 83 of the terminal device 80 via the communication path and the program interface unit 51, the storage control unit 74 discards the image data received by the driver unit 32 not to be stored in the image storage unit 73.

Figure 18:
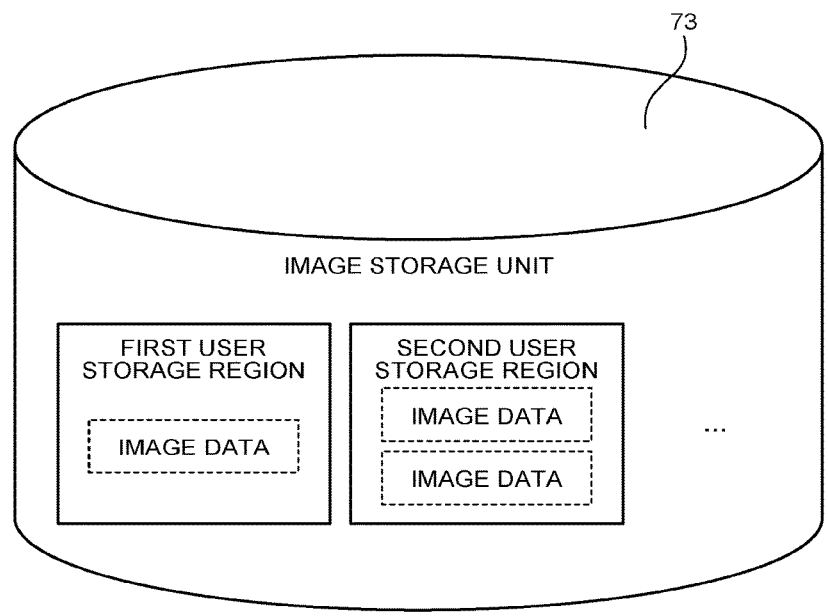
FIG. 18 is a diagram illustrating a storage region generated in an image storage unit according to the sixth embodiment.

FIG. 18 is a diagram illustrating the storage region generated in the image storage unit 73 according to the sixth embodiment. The image storage unit 73 stores therein the image data generated by being scanned by the scanner device 20. The region generation unit 94 generates a storage region corresponding to the user information in a region that can be accessed from an external device (for example, the terminal device 80) via the program interface unit 51 (WebAPI) in the image storage unit 73.

The storage region corresponding to the user information is, for example, a folder having a name of user information (for example, a user name). The image storage unit 73 has a folder for each piece of user information. The image data generated by being scanned by the scanner device 20 is stored in each folder. A format of the image data may be JPEG or other formats. A plurality of pieces of image data may be stored in one folder.

Figure 19:
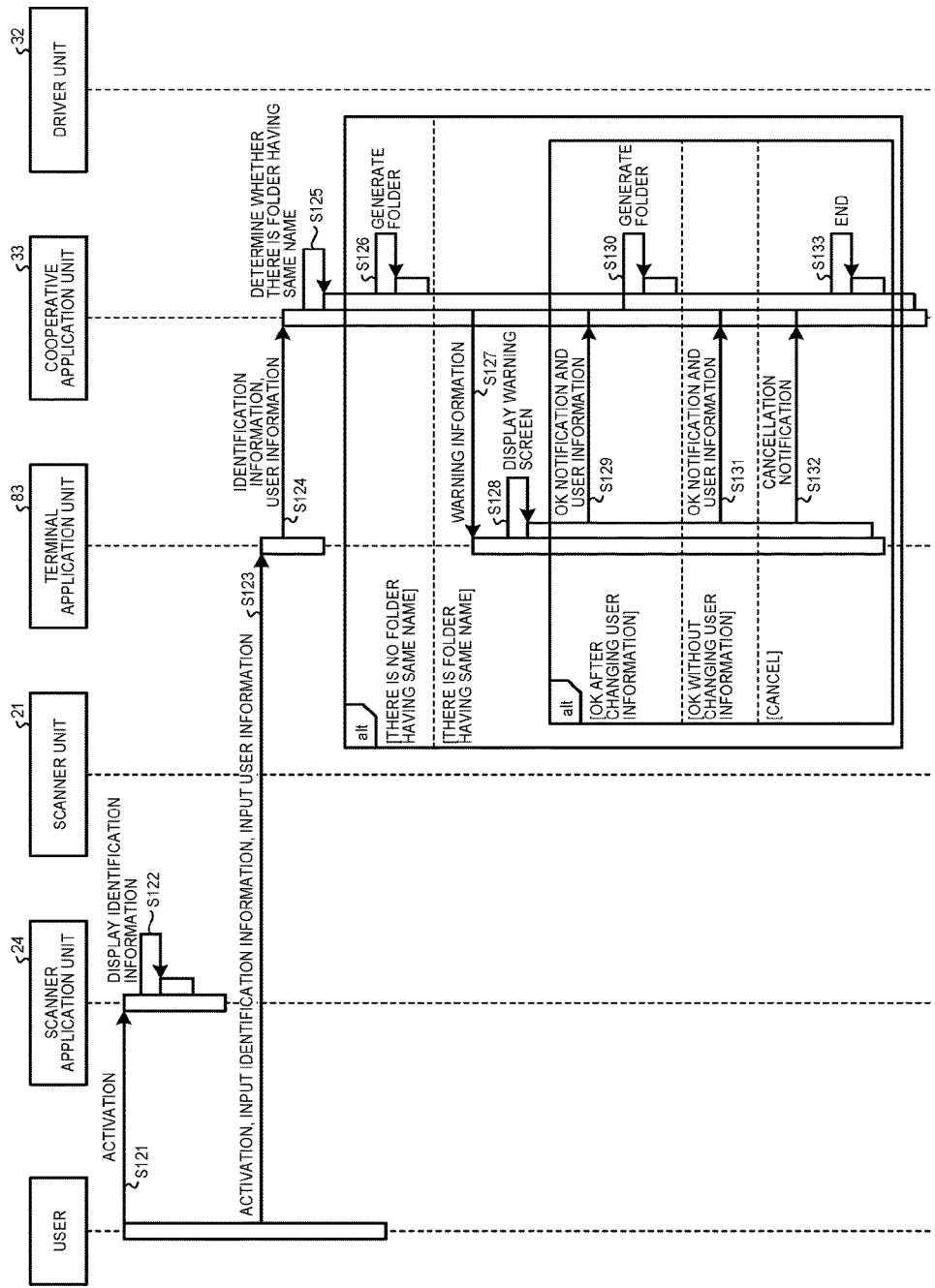
FIG. 19 is a sequence diagram of an information processing system according to the sixth embodiment.
Figure 20:
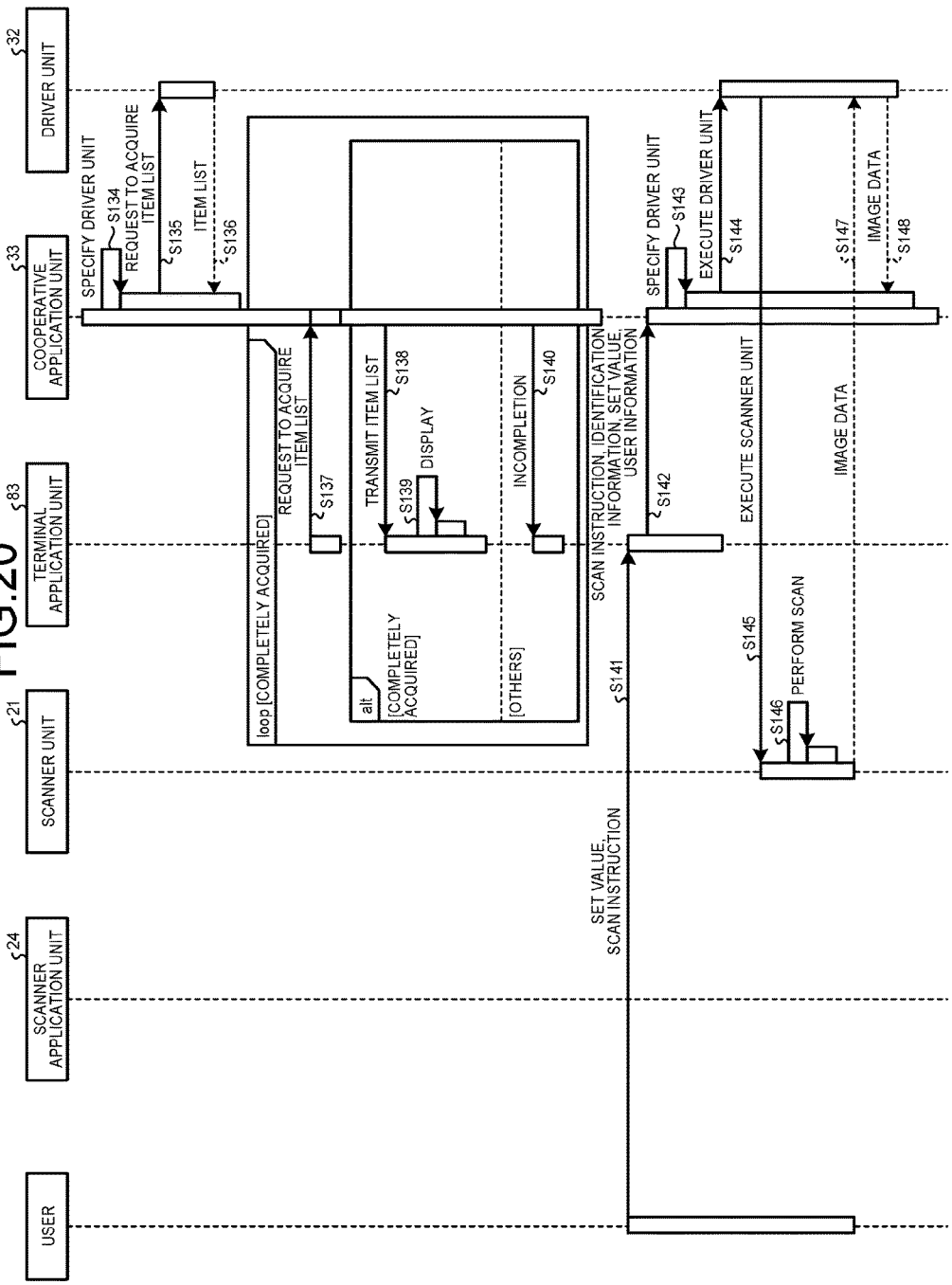
FIG. 20 is a sequence diagram subsequent to FIG. 19.
Figure 21:
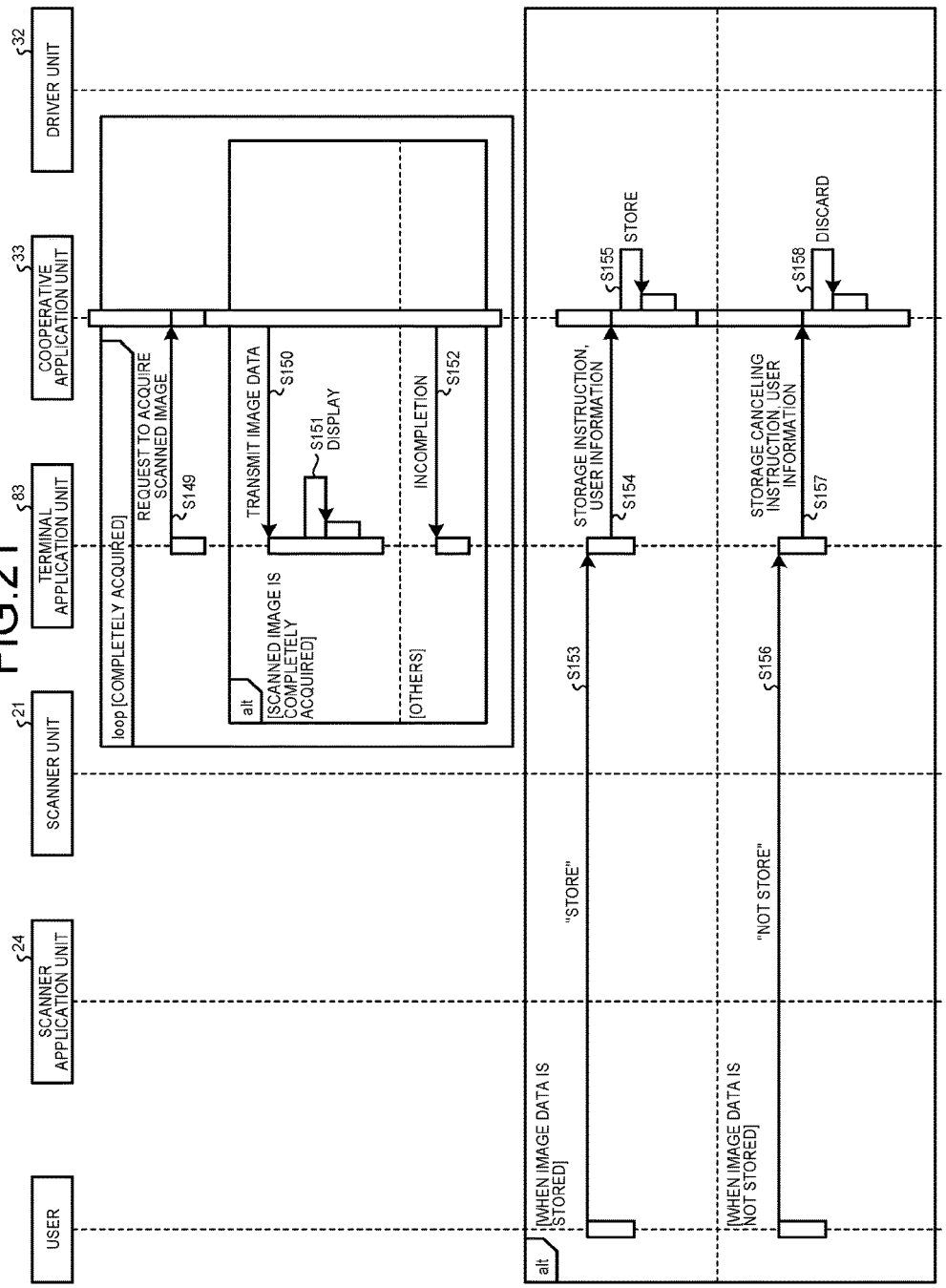
FIG. 21 is a sequence diagram subsequent to FIG. 20.

FIG. 19 is a sequence diagram of the information processing system 10 according to the sixth embodiment. FIG. 20 is a sequence diagram subsequent to FIG. 19. FIG. 21 is a sequence diagram subsequent to FIG. 20. The information processing system 10 according to the sixth embodiment performs processing through the sequences illustrated in FIG. 19, FIG. 20, and FIG. 21.

First, after setting a sheet and the like on the scanner device 20, the user operates the scanner device 20 to activate the scanner application unit 24 (S121). When being activated by the user, the scanner application unit 24 displays the identification information (for example, a device name) for identifying the scanner device 20 (S122).

Subsequently, the user operates the terminal device 80 to activate the terminal application unit 83, and inputs the identification information displayed on the scanner device 20 and the user information to the terminal application unit 83 (S123).

The terminal application unit 83 may cause the user to manually input the identification information, or may automatically acquire the identification information from the scanner device 20. The terminal application unit 83 may cause the user to visually check the identification information displayed on the scanner device 20, and cause the user to input the identification information using a keyboard and the like. The terminal application unit 83 may cause the user to image code information (for example, QR (registered trademark) code) displayed by the scanner device 20 with a camera and the like, and analyze the taken image to acquire the identification information. The terminal application unit 83 may receive the identification information from the scanner device 20 through short-range wireless communication such as Bluetooth (registered trademark). The terminal application unit 83 may receive an e-mail transmitted from the scanner device 20, and acquire the identification information described in the e-mail.

The terminal application unit 83 may cause the user to manually input the user information, or may automatically acquire the user information from the terminal OS unit 81. The terminal application unit 83 may cause the user to input the user information using a keyboard and the like. The terminal application unit 83 may automatically acquire information that is registered in the terminal OS unit 81 in advance by the user as the user formation from the terminal OS unit 81 at the time of activation. The terminal application unit 83 may automatically acquire information such as a model number that is registered in the terminal OS unit 81 in advance from the terminal OS unit 81 as the user information at the time of activation.

When being activated by the user and receiving the identification information and the user information, the terminal application unit 83 transmits the identification information and the user information to the cooperative application unit 33 (S124).

When receiving the identification information and the user information, the cooperative application unit 33 analyzes all folders generated in the image storage unit 73, and determines whether there is the storage region corresponding to the user information (in this example, a folder having the same name as the user information) (S125).

If there is no folder having the same name, the cooperative application unit 33 generates a folder having a name of user information in the image storage unit 73 (S126). After generating the folder, the cooperative application unit 33 advances the process to Step S134.

If there is a folder having the same name, the cooperative application unit 33 transmits the warning information to the terminal application unit 83 (S127). When receiving the warning information, the terminal application unit 83 displays a warning screen corresponding to the received warning information (S128).

Figure 22:
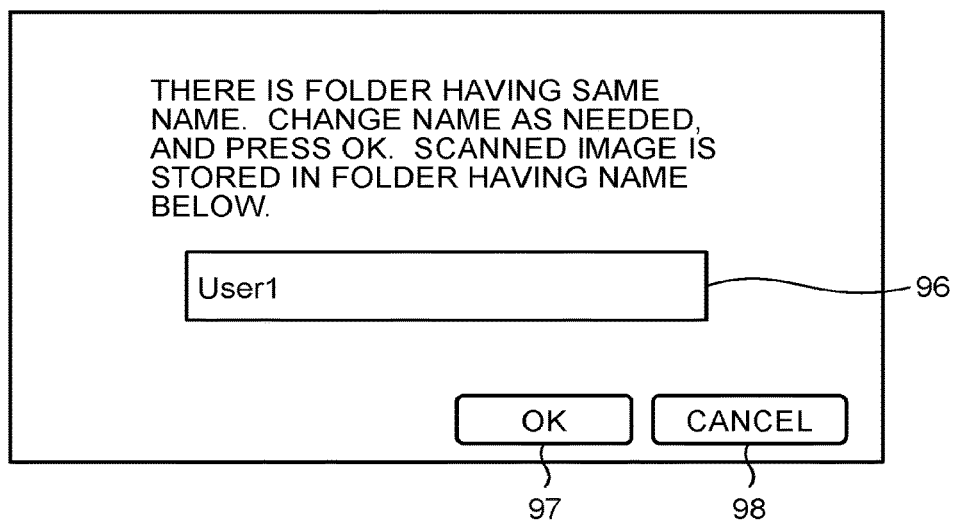
FIG. 22 is a diagram illustrating an example of a warning screen displayed on the terminal device according to the sixth embodiment.

For example, the terminal application unit 83 displays the warning screen as illustrated in FIG. 22. On the warning screen, displayed are a box 96 for inputting changed user information, an OK button 97 for approving the user information, and a cancel button 98 for canceling processing.

To change the user information, the user inputs new user information in the box 96, and presses the OK button 97. When the user information is not changed, that is, when the image data is stored in an existing folder, the user presses the OK button 97 without inputting new user information in the box 96 (or after inputting the same user information therein). To end the process, the user presses the cancel button 98.

When the OK button 97 is pressed, the terminal application unit 83 transmits an OK notification and the user information to the cooperative application unit 33 (S129, S131). When the user information is changed by the user, the terminal application unit 83 transmits the changed new user information. When the user information is not changed, the terminal application unit 83 transmits the original user information.

When receiving the OK notification and the user information, the cooperative application unit 33 determines whether the user information is changed as compared with the user information before the warning information is transmitted. If the user information is changed (S129), the cooperative application unit 33 generates a folder of new user information the name of which is changed in the image storage unit 73 (S130). In this case, the cooperative application unit 33 determines whether there is a folder having the same name as the new user information in the image storage unit 73 again, and if there is the folder having the same name as the new user information in the image storage unit 73, the process may be returned to S127. After generating the folder, the cooperative application unit 33 advances the process to Step S134.

If the user information is not changed (S131), the cooperative application unit 33 advances the process to Step S134 without performing any processing.

When the cancel button 98 is pressed, the terminal application unit 83 transmits a cancellation notification to the cooperative application unit 33 (S132). When receiving the cancellation notification, the cooperative application unit 33 performs end processing (S133) to end this sequence.

To store the image data after generating the folder or in an existing folder, the cooperative application unit 33 specifies the driver unit 32 that controls the scanner device 20 identified by the identification information (S134). The information processing device 30 may include a plurality of driver units 32 different for each type of the scanner device 20. Thus, the cooperative application unit 33 specifies one driver unit 32 corresponding to the type of the scanner device 20 that has transmitted the identification information based on the identification information. For example, the cooperative application unit 33 specifies the driver unit 32 the name of which includes the identification information.

Subsequently, the cooperative application unit 33 requests the specified driver unit 32 for the list of items that can be set for the specified driver unit 32 to control the scanner device 20 (S135), and acquires the list from the driver unit 32 (S136).

On the other hand, after transmitting the identification information to the cooperative application unit 33, the terminal application unit 83 transmits the item list acquisition request to the cooperative application unit 33 (S137). If the cooperative application unit 33 has already completely acquired the list from the driver unit 32 when receiving the item list acquisition request, the cooperative application unit 33 transmits the list of items to the terminal application unit 83 (S138). The terminal application unit 83 then displays the acquired list of items (S139). If the cooperative application unit 33 has not completely acquired the list from the driver unit 32 yet when receiving the item list acquisition request, the cooperative application unit 33 transmits the notification of incompletion to the terminal application unit 83 (S140). When receiving the notification of incompletion, the terminal application unit 83 transmits the item list acquisition request to the cooperative application unit 33 again (S137), and repeats the processing until receiving the list of items.

When the list of items is displayed, the user operates the terminal device 80 to input the set value for each item. When the set values are completely input, the user operates the terminal device 80 to give the scan instruction to the terminal application unit 83 (S141).

When receiving the scan instruction from the user, the terminal application unit 83 transmits, together with the scan instruction, the identification information, the user information, and the set value for each item to the cooperative application unit 33 (S142). When receiving the scan instruction, the cooperative application unit 33 specifies the driver unit 32 that controls the scanner device 20 identified by the identification information (S143). The cooperative application unit 33 gives the execution instruction and the set value for each item to the specified driver unit 32 (S144). At this point, the cooperative application unit 33 temporarily stores the user information received with the scan instruction.

When receiving the execution instruction, the driver unit 32 controls the scanner unit 21 in accordance with the set values, and executes the scanner unit 21 (S145). The scanner unit 21 then performs scan of the set sheet in accordance with control performed by the driver unit 32 (S146).

Subsequently, the scanner unit 21 transmits the image data generated by scanning to the driver unit 32 (S147). The driver unit 32 then gives the received image data to the cooperative application unit 33 (S148). In this case, the driver unit 32 may perform image processing on the image data received from the scanner unit 21 in accordance with the set values, and give the image data after image processing to the cooperative application unit 33.

The cooperative application unit 33 links the image data obtained by scanning with the user information received with the scan instruction, and temporarily stores them. For example, the program interface unit 51 may create and store a table in which a file name of the scanned image is linked with the user information. The program interface unit 51 may temporarily store a name combining the file name of the scanned image and the user information.

On the other hand, after transmitting the scan instruction to the cooperative application unit 33, the terminal application unit 83 transmits the scanned image acquisition request to the cooperative application unit 33 (S149). If the cooperative application unit 33 has already completely acquired the image data from the driver unit 32 when receiving the scanned image acquisition request, the cooperative application unit 33 transmits the image data to the terminal application unit 83 (S150). Subsequently, the terminal application unit 83 causes the user interface unit 82 to display a button by which the user selects whether to store the received image data and the image data generated by scanning, or to cancel storage (S151). For example, the terminal application unit 83 displays an image as illustrated in FIG. 10.

If the cooperative application unit 33 has not completely acquired the image data from the driver unit 32 yet when receiving the scanned image acquisition request, the cooperative application unit 33 transmits the notification of incompletion to the terminal application unit 83 (S152). When receiving the notification of incompletion, the terminal application unit 83 transmits the scanned image acquisition request to the cooperative application unit 33 again (S149), and repeats the processing until receiving the image data.

Subsequently, the user checks the image data displayed on the user interface unit 82, and selects whether to store the image data. When the user selects to store the image data (S153), the terminal application unit 83 transmits the storage instruction and the user information to the cooperative application unit 33 (S154). When receiving the storage instruction from the terminal application unit 83, the cooperative application unit 33 selects a piece of image data stored while being linked with the received user information from among pieces of image data that are temporarily stored. The cooperative application unit 33 stores the selected piece of image data in the storage region corresponding to the received user information (for example, a folder having a name of user information) in the image storage unit 73 (S155).

When the user selects not to store the image data (S156), the terminal application unit 83 transmits the storage canceling instruction and the user information to the cooperative application unit 33 (S157). When receiving the storage canceling instruction from the terminal application unit 83, the cooperative application unit 33 selects and discards a piece of image data stored while being linked with the received user information from among pieces of image data that are temporarily stored (S158).

Table 4 and Table 5 below are an example of requests for WebAPI and responses between the terminal application unit 83 and the program interface unit 51 in the sequences illustrated in FIG. 19, FIG. 20, and FIG. 21. In the sixth embodiment, the requests and the responses in Table 4 and Table 5 below are used in addition to the requests and the responses used in the first embodiment to the fifth embodiment.

TABLE 4

| Sequence No. | Request/Response | Example |
|---|---|---|
| S124 Transmission of identification information and user information | Request | POST /scan/devicesettings HTTP/1.1<br>Host: 10.20.30.40:80<br>modelname=XXXXXXXX<br>username=User1 |
| S127 Transmission of warning information | Response | HTTP/1.1 200 OK<br>Content-Type: text/plain; charset=utf-8<br><?xml version="1.0" encoding="UTF-8"?><br><result><br>Already Exist<br></result> |
| S129, S131 OK notification | Request | POST /scan/devicesettings HTTP/1.1<br>Host: 10.20.30.40:80<br>username=User1<br>Confirmed=true |
| S132 Cancellation notification | Request | POST /scan/devicesettings HTTP/1.1<br>Host: 10.20.30.40:80<br>username=User1<br>Confirmed=false |
| S142 Scan instruction | Request | POST /scan/devicesettings HTTP/1.1<br>Host: 10.20.30.40:80<br>modelname=XXXXXXXX<br>username=User1<br>filename=20140808_conference_material1<br>Xresolution=1200<br>Yresolution=1200<br>Contrast=3 |

TABLE 5

| Sequence No. | Request/Response | Example |
|---|---|---|
| S154 Storage instruction | Request | POST /scan/result HTTP/1.1<br>Host: 10.20.30.40:80<br>save=true<br>filename=20140808_conference_material1<br>username=User1 |
| S157 Storage canceling instruction | Request | POST /scan/result HTTP/1.1<br>Host: 10.20.30.40:80<br>save=false<br>filename=20140808_conference_material1<br>username=User1 |

Transmission of the identification information and the user information at S124 is a request such that the terminal application unit 83 transmits the identification information (device name) and the user information (user name) to the program interface unit 51. "modelname=XXXXXXXX" represents a device name of the scanner device 20. "username=User1" represents the user information (user name) input by the user.

Transmission of the warning information at S127 is a response such that the program interface unit 51 transmits the warning information to the terminal application unit 83. "Already Exist" represents that the storage region (folder) corresponding to the user information (user name) has already been generated in the image storage unit 73.

OK notification at S129 and S131 is a request such that the terminal application unit 83 notifies the program interface unit 51 that the OK button 97 is pressed on the warning screen. "username=User1" represents the user information (user name) input on the warning screen. "Confirmed=true" represents that it is confirmed that the folder is generated using the user information to be transmitted.

The cancellation notification at S132 is a request such that the terminal application unit 83 notifies the program interface unit 51 that the cancel button 98 is pressed on the warning screen. "username=User1" represents the user information (user name) input on the warning screen. "Confirmed=false" represents that the processing is canceled.

Scan instruction at S142 is a request such that the terminal application unit 83 transmits, together with the scan instruction, the identification information, the user information, and the set value for each item to the program interface unit 51. "username=User1" represents the user information (user name) managed by the terminal application unit 83.

The storage instruction at S154 is a request such that the terminal application unit 83 instructs the program interface unit 51 to store the image data scanned by the user operating the terminal device 80. "username=User1" represents the user information (user name) linked with the image data to be stored.

The storage canceling instruction at S157 is a request such that the terminal application unit 83 instructs the program interface unit 51 to discard the image data scanned by the user operating the terminal device 80. "username=User1" represents the user information (user name) linked with the image data to be discarded.

As described above, the information processing system 10 according to the sixth embodiment can cause each user to control the scanner device 20 by using the terminal device 80 held by himself/herself. Accordingly, the information processing system 10 according to the sixth embodiment can cause one scanner device 20 to be shared among a plurality of users.

Figure 23:
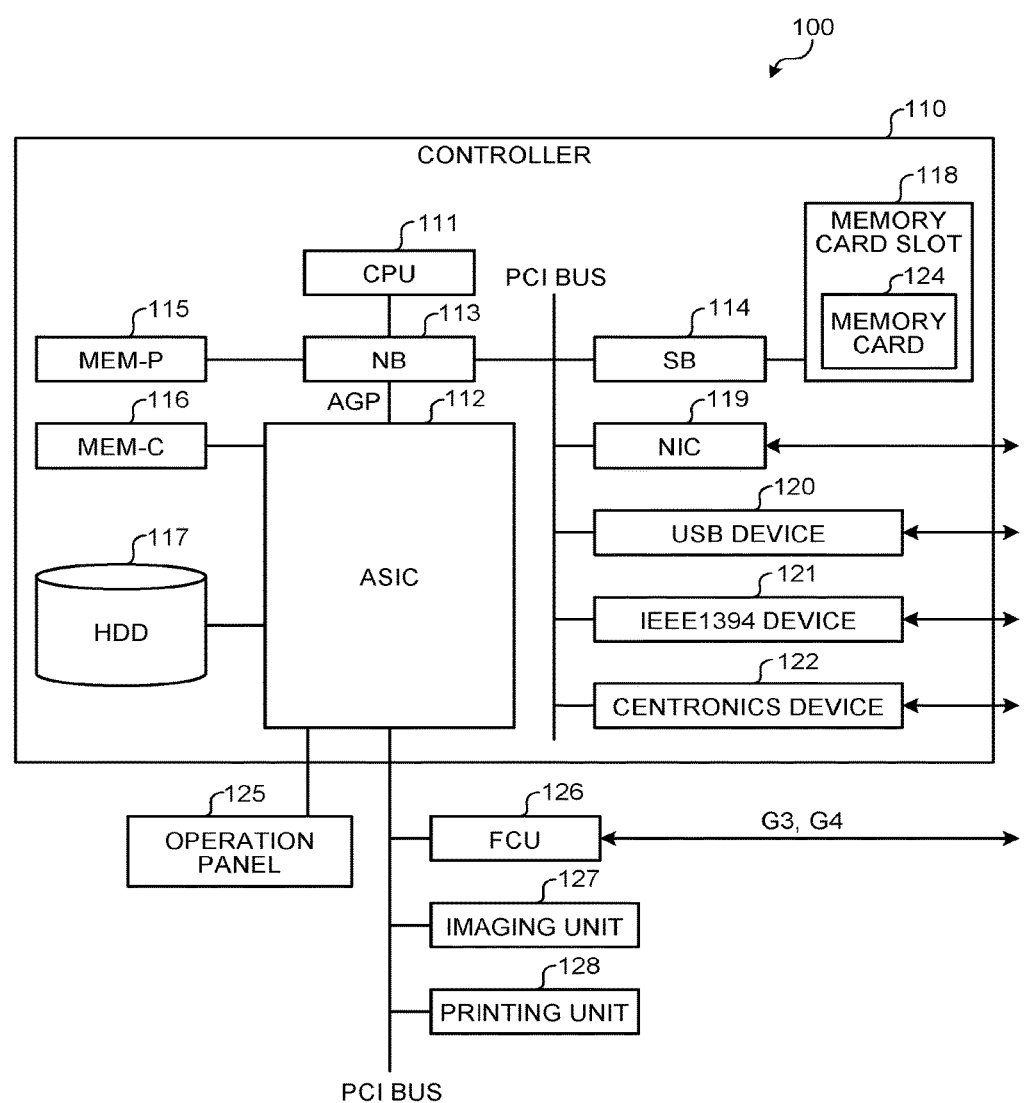
FIG. 23 is a diagram illustrating a hardware configuration of a multifunction peripheral.

FIG. 23 is a diagram illustrating an example of a hardware configuration of a multifunction peripheral 100 in which the function of the scanner device 20 is mounted. By way of example, the multifunction peripheral 100 includes a controller 110, an operation panel 125, a facsimile control unit (FCU) 126, an imaging unit 127, and a printing unit 128.

The controller 110 includes a central processing unit (CPU) 111, an application specific integrated circuit (ASIC) 112, a Northbridge (NB) 113, a Southbridge (SB) 114, a system memory (MEM-P) 115, a local memory (MEM-C) 116, a hard disk drive (HDD) 117, a memory card slot 118, a network interface controller (NIC) 119, a USB device 120, an IEEE1394 device 121, and a Centronics device 122.

The CPU 111 is an IC for executing various pieces of information processing, and executes applications in process units in parallel on an operating system (OS) or a platform. The ASIC 112 is a semiconductor device for image processing. The NB 113 is a bridge for connecting the CPU 111 with the ASIC 112. The SB 114 is a bridge for connecting the NB 113 with peripherals and the like. The ASIC 112 is connected with the NB 113 via an accelerated graphics port (AGP), for example.

The MEM-P 115 is a memory connected to the NB 113. The MEM-C 116 is a memory connected to the ASIC 112. The HDD 117 is a storage connected to the ASIC 112, and used for accumulating image data, document data, a computer program, font data, form data, and the like.

The HDD 117 stores therein various application programs (a copy program, a scanner program, a printer program, a facsimile program, and the like). The HDD 117 also stores therein various plug-in programs.

The memory card slot 118 is connected to the SB 114, and used for setting (inserting) the memory card 124. The memory card 124 is a flash memory such as a USB memory, and used for distributing a computer program. The computer program may be distributed by being downloaded from a predetermined server to the multifunction peripheral 100.

The NIC 119 is a controller for performing data communication using a MAC address and the like via a network and the like. The USB device 120 is a device for providing a serial port conforming to a universal serial bus (USB) standard. The IEEE1394 device 121 is a device for providing a serial port conforming to an IEEE1394 standard. The Centronics device 122 is a device for providing a parallel port conforming to Centronics specification. The NIC 119, the USB device 120, the IEEE1394 device 121, and the Centronics device 122 are connected to the NB 113 and the SB 114 via a peripheral component interconnect (PCI) bus.

The operation panel 125 is hardware (operation unit) through which the user gives an input to the multifunction peripheral 100, and is hardware (display unit) on which a menu screen is displayed by the multifunction peripheral 100. The operation panel 125 is connected to the ASIC 112. The FCU 126, the imaging unit 127, the printing unit 128 are connected to the ASIC 112 via the PCI bus.

The imaging unit 127 optically scans a document placed on a contact glass, A/D converts reflected light therefrom, and performs image processing to generate color or monochrome image data.

The printing unit 128 includes, for example, a tandem-type photoconductor drum, modulates a laser beam based on image data or page description language (PDL) data, and scans the photoconductor drum to form a latent image. The printing unit 128 then transfers an image for each page developed by attaching toner to the latent image to a sheet with heat and pressure. The printing unit 128 is not limited to such an electrophotographic plotter, and may be an inkjet plotter engine that forms an image by discharging droplets.

Figure 24:
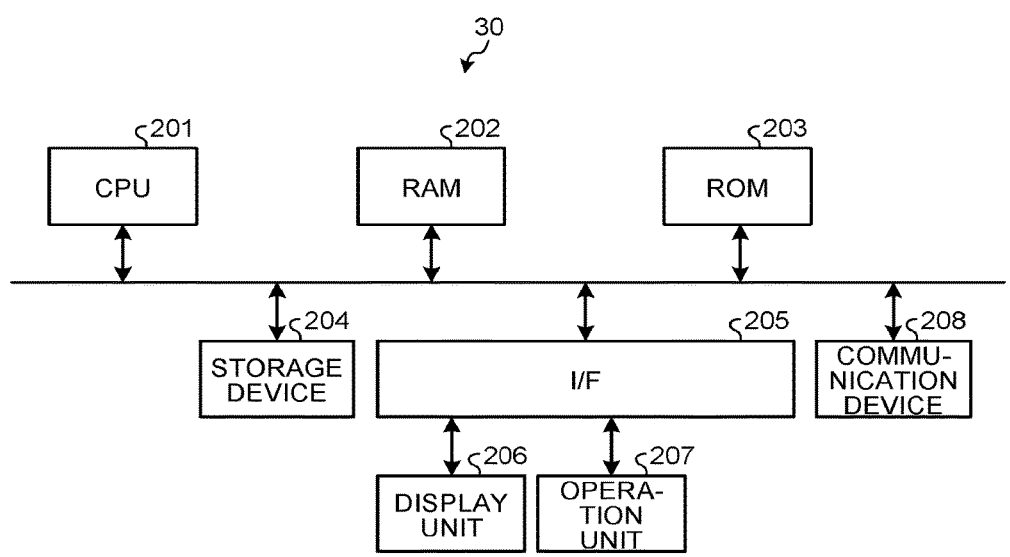
FIG. 24 is a diagram illustrating a hardware configuration of the information processing device.

FIG. 24 is a diagram illustrating an example of a hardware configuration of the information processing device 30. By way of example, the information processing device 30 is implemented by a hardware configuration of a typical computer as illustrated in FIG. 24. The terminal device 80 may have a similar hardware configuration.

The information processing device 30 includes a CPU 201, a random access memory (RAM) 202, a read only memory (ROM) 203, a storage device 204, an I/F 205, a display unit 206, an operation unit 207, and a communication device 208. These components are connected with each other via a bus.

The CPU 201 is a processor that performs arithmetic processing, control processing, and the like in accordance with a computer program. The CPU 201 performs various pieces of processing in cooperation with a computer program stored in the ROM 203, the storage device 204, and the like using a predetermined region of the RAM 202 as a working area.

The RAM 202 is a memory such as a synchronous dynamic random access memory (SDRAM). The RAM 202 functions as a working area for the CPU 201. The ROM 203 is a memory that stores therein a computer program and various pieces of information in a non-rewritable manner.

The storage device 204 is a device that writes and reads data to/from a storage medium using a semiconductor such as a flash memory, a storage medium in which data can be magnetically or optically recorded, or the like. The storage device 204 writes and reads the data to/from the storage medium in accordance with control performed by the CPU 201.

The I/F 205 is an interface for connecting the display unit 206 and the operation unit 207 to the bus. The display unit 206 is a display device such as a liquid crystal display (LCD). The display unit 206 displays various pieces of information based on a display signal from the CPU 201. The operation unit 207 is an input device such as a mouse and a keyboard. The operation unit 207 receives information operationally input by the user as an instruction signal, and outputs the instruction signal to the CPU 201. The communication device 208 communicates with other devices via a network in accordance with control performed by the CPU 201.

The computer program executed by the information processing device 30 according to the embodiment includes a specification module, an item acquisition module, a scan instruction reception module, and an execution control module. The computer program is loaded and executed on the RAM 202 by the CPU 201 (processor) to cause the information processing device 30 to function as the specification unit 61, the item acquisition unit 62, the scan instruction reception unit 63, and the execution control unit 64.

The computer program executed by the multifunction peripheral 100 according to the embodiment includes an identification information transmission module, an item output module, and a scan instruction transmission module. This computer program is loaded and executed on the MEM-P 115 by the CPU 111 (processor) to cause the multifunction peripheral 100 to function as the identification information transmission unit 41, the item output unit 42, and the scan instruction transmission unit 43.

The computer programs executed by the information processing device 30 and the multifunction peripheral 100 according to the embodiment are recorded and provided in a computer-readable recording medium such as a compact disc read only memory (CD-ROM), a flexible disk (FD), a compact disc recordable (CD-R), and a digital versatile disc (DVD), as an installable or executable file for a computer.

The computer programs executed by the information processing device 30 and the multifunction peripheral 100 according to the embodiment may be stored in a computer connected to a network such as the Internet and provided by being downloaded via the network. Furthermore, the computer programs executed by the information processing device 30 and the multifunction peripheral 100 according to the embodiment may be provided or distributed via a network such as the Internet. The computer programs executed by the information processing device 30 and the multifunction peripheral 100 may be embedded and provided in a ROM, for example.

According to the embodiments described above, labor of the user for performing operation can be reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing device, comprising:
   circuitry configured to:
   receive, from a terminal device, identification information for identifying a scanner device;
   specify a driver configured to control the scanner device based on the received identification information;
   acquire a list identifying items that are settable for the specified driver for controlling the scanner device;
   receive, from the terminal device after receiving the identification information, a request for receiving the list identifying the items that are settable for the specified driver;
   output a notification of incompletion to the terminal device when the request is received before the list is completely acquired;
   output the list to the terminal device when the request is received after the list is completely acquired;
   receive, from the terminal device, a scan instruction and set values for the items after outputting the list to the terminal device; and
   execute the specified driver, in response to the received scan instruction and using the set values for the items, to cause the scanner device to perform a scanning operation,
   wherein the information processing device, the terminal device, and the scanner device are different devices.

2. The information processing device according to claim 1, further comprising:
   an image storage, wherein
   the circuitry is configured to:
   receive, by executing the specified driver, image data generated by the scanner device;
   receiving a storage instruction from the terminal device; and
   cause the image storage to store the received image data in response to the received storage instruction from the terminal device.

3. The information processing device according to claim 2, wherein the circuitry is configured to perform, by executing the specified driver using the set values, image processing on the received image data to generate processed image data.

4. The information processing device according to claim 3, wherein the circuitry is configured to transmit the processed image data to the terminal device.

5. The information processing device according to claim 1, wherein
   the information processing device further comprises an image storage, and
   the circuitry is configured to:
   receive, from the terminal device, user information for identifying a user of the terminal device;
   generate a storage region corresponding to the user information in the image storage;
   receive, by executing the specified driver, image data generated by the scanner device; and
   cause the storage region in the image storage to store the received image data in response to the received storage instruction from the terminal device.

6. The information processing device according to claim 5, wherein the circuitry is configured to generate the storage region corresponding to the user information in the image storage when the user information from the terminal device is received before receiving the scan instruction and the storage region corresponding to the received user information has not been generated in the image storage.

7. The information processing device according to claim 6, wherein the circuitry is configured to transmit warning information to the terminal device without generating the storage region corresponding to the user information in the image storage when the storage region corresponding to the user information has already been generated in the image storage; and
generate a new storage region corresponding to new user information in the image storage when receiving new user information different from the received user information.

8. The information processing device according to claim 5, wherein the circuitry is configured to generate the storage region corresponding to the user information in a region that is accessible from the terminal device.

9. The information processing device according to claim 1, wherein the circuitry is configured to, in response to the received identification information:
determine whether the driver configured to control the scanner device is installed on the information processing device; and
cause the information processing device to download and install the driver when the driver configured to control the scanner device is determined as not installed on the information processing device.

10. A non-transitory computer-readable storage medium with an executable program stored thereon, and the executable program when executed by a computer causing the computer to perform a method comprising:
receiving, from a terminal device, identification information for identifying a scanner device;
specifying a driver configured to control the scanner device based on the received identification information;
acquiring a list identifying items that are settable for the specified driver for controlling the scanner device;
receiving, from the terminal device after receiving the identification information, a request for receiving the list identifying the items that are settable for the specified driver;
outputting a notification of incompletion to the terminal device when the request is received before the list is completely acquired;
outputting the list to the terminal device when the request is received after the list is completely acquired;
receiving, from the terminal device, a scan instruction and set values for the items after outputting the list to the terminal device; and
executing the specified driver, in response to the received scan instruction and using the set values for the items, to cause the scanner device to perform a scanning operation,
wherein the computer, the terminal device, and the scanner device are different devices.

11. A system comprising:
a terminal device;
a scanner device; and
an information processing device configured to communicate with the scanner device and the terminal device, wherein
the information processing device includes circuitry configured to:
receive, from the terminal device, identification information for identifying the scanner device;
specify a driver configured to control the scanner device based on the received identification information;
acquire a list identifying items that are settable for the specified driver for controlling the scanner device;
receive, from the terminal device after receiving the identification information, a request for receiving the list identifying the items that are settable for the specified driver;
output a notification of incompletion to the terminal device when the request is received before the list is completely acquired;
output the list to the terminal device when the request is received after the list is completely acquired;
receive, from the terminal device, a scan instruction and set values for the items after outputting the list to the terminal device; and
execute the specified driver, in response to the received scan instruction and using the set values for the items, to cause the scanner device to perform a scanning operation, and
wherein the information processing device, the terminal device, and the scanner device are different devices.

12. The system according to claim 11, wherein
the terminal device includes circuitry configured to:
transmit the identification information to the information processing device;
receive, from the information processing device, the list identifying the items that are settable;
output the list to a user;
receive an input of the set values corresponding to the items; and
transmit the set values corresponding to the items, together with the scan instruction, to the information processing device.

13. The system according to claim 11, wherein the circuitry of the information processing device is configured to, in response to the received identification information:
determine whether the driver configured to control the scanner device is installed on the information processing device; and
cause the information processing device to download and install the driver when the driver configured to control the scanner device is determined as not installed on the information processing device.

14. The non-transitory computer-readable storage medium according to claim 10, wherein the method further comprises, in response to the received identification information:
determining whether the driver configured to control the scanner device is installed on the computer; and
causing the computer to download and install the driver when the driver configured to control the scanner device is determined as not installed on the computer.

* * * * *